(12) United States Patent
Yoon et al.

(10) Patent No.: US 10,139,484 B2
(45) Date of Patent: Nov. 27, 2018

(54) APPARATUS AND METHOD FOR WIRELESS DISTANCE MEASUREMENT

(71) Applicant: Samsung Electronics Co., Ltd., Suwon-si (KR)

(72) Inventors: Sung-Rok Yoon, Seoul (KR); Jong-Ho Oh, Suwon-si (KR); Jung-Min Yoon, Seoul (KR); Sang-Hyun Chang, Seoul (KR); Chang-Yeul Kwon, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 432 days.

(21) Appl. No.: 14/826,817

(22) Filed: Aug. 14, 2015

(65) Prior Publication Data

US 2016/0047879 A1 Feb. 18, 2016

(30) Foreign Application Priority Data

Aug. 14, 2014 (KR) .................. 10-2014-0106005

(51) Int. Cl.
  *G01S 3/02* (2006.01)
  *G01S 13/74* (2006.01)
  *G01S 11/08* (2006.01)
  *G01S 5/02* (2010.01)
  *G01S 5/14* (2006.01)

(52) U.S. Cl.
  CPC ............... *G01S 13/74* (2013.01); *G01S 11/08* (2013.01); *G01S 5/0263* (2013.01); *G01S 5/14* (2013.01)

(58) Field of Classification Search
  CPC ........ G01S 5/0072; G01S 5/06; G01S 5/0263; G01S 19/24; G01S 13/74; G01S 5/14; G01S 19/31; G01S 11/08

USPC .............. 342/458, 357.63, 357.71
See application file for complete search history.

(56) References Cited

U.S. PATENT DOCUMENTS

| | | | |
|---|---|---|---|
| 7,580,378 B2* | 8/2009 | Carrender | G01S 5/14 370/278 |
| 7,649,491 B2* | 1/2010 | Ohara | G01S 13/84 342/118 |
| 7,990,308 B2* | 8/2011 | Birdsong, Jr. | G01S 13/887 342/196 |
| 8,675,746 B2* | 3/2014 | Hamalainen | G01S 11/08 375/260 |

(Continued)

*Primary Examiner* — Chuong P Nguyen
(74) *Attorney, Agent, or Firm* — McAndrews, Held & Malloy, Ltd.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. An apparatus and method for measuring a distance between wireless devices using a first signal transmitted/received between the wireless devices in a wireless communication system are provided. The method includes: receiving the first signal for distance measurement transmitted from a first of the wireless devices; receiving a signal reflected by a reflector after being transmitted from the first of the wireless devices; and based on the received first signal and the received reflected signal, estimating a distance between the second of the wireless devices and the reflector.

36 Claims, 28 Drawing Sheets

(56) References Cited

U.S. PATENT DOCUMENTS

| | | | |
|---|---|---|---|
| 9,709,662 B2* | 7/2017 | Baker | G01S 5/0273 |
| 9,797,988 B2* | 10/2017 | Charvat | G01S 5/14 |
| 2002/0142782 A1 | 10/2002 | Berliner et al. | |
| 2004/0214565 A1 | 10/2004 | Shinmei | |
| 2005/0135190 A1* | 6/2005 | Katou | G01S 7/5273 |
| | | | 367/99 |
| 2006/0197704 A1* | 9/2006 | Luzzatto | G01S 11/06 |
| | | | 342/458 |
| 2007/0178837 A1 | 8/2007 | Koike | |
| 2009/0011713 A1 | 1/2009 | Abusubaih et al. | |
| 2009/0033545 A1 | 2/2009 | Pllcher et al. | |
| 2009/0207070 A1 | 8/2009 | Park et al. | |
| 2010/0159842 A1 | 6/2010 | Fukagawa et al. | |
| 2010/0183063 A1 | 7/2010 | Fukagawa et al. | |
| 2010/0202303 A1 | 8/2010 | Yong et al. | |
| 2011/0221633 A1 | 9/2011 | Schramm et al. | |
| 2013/0258889 A1 | 10/2013 | Ponnuswamy | |
| 2014/0087758 A1* | 3/2014 | Maor | G01S 5/0252 |
| | | | 455/456.1 |
| 2015/0016224 A1* | 1/2015 | Houshuyama | G01S 7/536 |
| | | | 367/93 |
| 2015/0346341 A1* | 12/2015 | Gogolla | G01S 17/023 |
| | | | 356/4.04 |
| 2018/0017672 A1* | 1/2018 | Warke | G01S 13/08 |

\* cited by examiner

APPARATUS AND METHOD FOR WIRELESS DISTANCE MEASUREMENT

PRIORITY

This application claims priority under 35 U.S.C. § 119(a) to a Korean Patent Application Serial No. 10-2014-0106005, which was filed in the Korean Intellectual Property Office on Aug. 14, 2014, the entire content of which is hereby incorporated by reference.

BACKGROUND

1. Field of the Invention

The present invention relates to signal transmission/reception through a wireless device of a wireless communication system.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

With the latest growth of wireless communication technology, transmission/reception of signals through wireless devices is increasing. Users may transmit/receive signals through wirelessly accessible wireless devices such as smartphones while transmitting/receiving various data (e.g., multimedia data such as video, music, a photo, a document, etc.).

SUMMARY

Accordingly, exemplary embodiments of the present invention are to provide an apparatus and method for measuring a distance between wireless devices using a signal transmitted/received between the wireless devices in a wireless communication system.

Exemplary embodiments of the present invention are to provide an apparatus and method for measuring a distance between two wireless devices and a reflector using the two wireless devices in a wireless communication system.

Exemplary embodiments of the present invention are to provide an apparatus and method for measuring a distance between two wireless devices using the two wireless devices in a wireless communication system.

Exemplary embodiments of the present invention are to provide an apparatus and method for enabling a user to conveniently recognize a distance measurement result between wireless devices and a reflector in a wireless communication system.

According to one exemplary embodiment of the present invention, a method for distance measurement by a second wireless device of a wireless communication system includes: receiving a first signal for distance measurement transmitted from a first wireless device; receiving a signal reflected by a reflector after being transmitted from the first wireless device; and based on the received first signal and the received reflected signal, estimating a distance between the second wireless device and the reflector.

According to another exemplary embodiment of the present invention, a method for distance measurement by a first wireless device of a wireless communication system includes: transmitting a first signal for distance measurement; and receiving information about a distance between a second wireless device and a reflector, the distance being estimated by the second wireless device. The information about the estimated distance includes information about a distance that is estimated based on the first signal received by the second wireless device after being transmitted from the first wireless device and a signal reflected by the reflector and received by the second wireless device after being transmitted from the first wireless device.

According to a further exemplary embodiment of the present invention, a distance measurement apparatus of a second wireless device in a wireless communication system includes a transmission/reception unit to receive a first signal for distance measurement transmitted from a first wireless device, and to receive a signal reflected by a reflector after being transmitted from the first wireless device; and a distance estimation module to, based on the received signals, estimate a distance between the second wireless device and the reflector.

According to a yet another exemplary embodiment of the present invention, a distance measurement apparatus of a first wireless device in a wireless communication system includes a transmission/reception unit to transmit a first signal for distance measurement, and to receive information about a distance between a second wireless device and a reflector, the distance being estimated by the second wireless device; and a distance estimation module. The information about the estimated distance includes information about a distance that is estimated based on the first signal received by the second wireless device after being transmitted from the first wireless device and a signal reflected by the reflector and received by the second wireless device after being transmitted from the first wireless device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

FIG. 1A to FIG. 17C explain the principles of the invention and are just for illustration, and should not be construed as limiting.

Exemplary embodiments of the present invention to be described below propose an apparatus and method for measuring a distance through transmission/reception of a signal between two wireless devices in a wireless communication system. This distance measurement apparatus uses the two wireless devices to transmit/receive a signal, thereby measuring a distance between the wireless device and a reflector or measuring a distance between the wireless devices.

In one example, a wireless device may be a portable electronic device having a wireless access function, such as a smartphone. In another example, the wireless device may be one of a portable terminal, a mobile phone, a mobile pad, a media player, a tablet computer, a handheld computer, a wireless accessible camera, a smart television, or a Personal Digital Assistant (PDA). In a further example, the wireless device may be a wearable electronic device such as a smartwatch and smart glasses. In a yet another example, the wireless device may be a device combining functions of two or more of the aforementioned devices.

In one exemplary embodiment, the wireless communication system may be a Device-To-Device (D2D) network. In another exemplary embodiment, the wireless communication system may be a Local Area Network (LAN) network. In a further exemplary embodiment, the wireless communication system may be a wireless network supporting a group play function between devices.

Figure 1A:
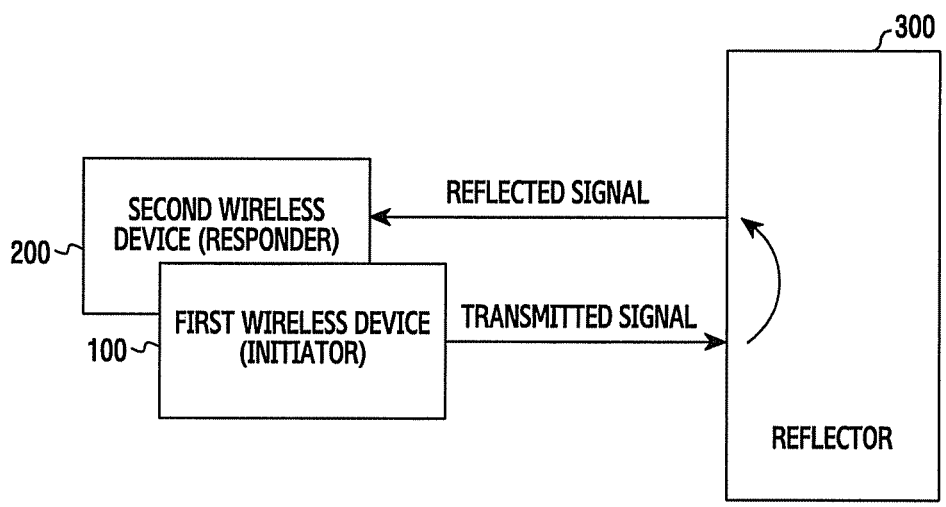
FIG. 1A and FIG. 1B are diagrams showing a wireless distance measurement operation according to exemplary embodiments of the present invention.
Figure 1B:
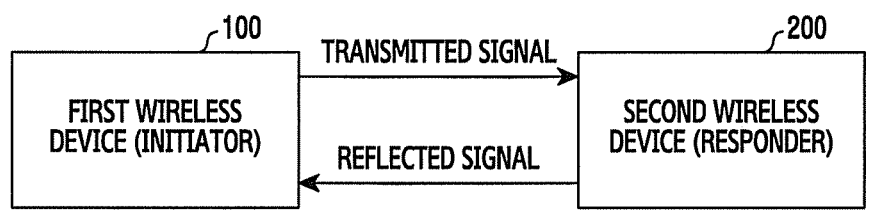

FIG. 1A and FIG. 1B are diagrams for explaining a wireless distance measurement operation according to exemplary embodiments of the present invention. Below, a first wireless device 100 may be defined as an initiator leading the distance measurement operation, and a second wireless device 200 may be defined as a responder becoming an object of the distance measurement operation led by the first wireless device 100. Inversely, the second wireless device 200 may be defined as the initiator, and the first wireless device 100 may be defined as the responder. Operations of the first wireless device 100 being the initiator and the second wireless device 200 being the responder each will be apparent from the following description.

FIG. 1A is a diagram for explaining a distance measurement operation according to a first mode of the present invention.

Referring to FIG. 1A, two wireless devices 100 and 200 contacting with each other function as wireless rulers for measuring a distance between the wireless devices 100 and 200 and a reflector (e.g., a wall) 300. The first wireless device 100 transmits a first signal. The reflector 300 reflects the signal transmitted from the first wireless device 100. The second wireless device 200 receives the signal reflected by the reflector 300 and the first signal transmitted from the first wireless device 100. Based on the received first signal and the received reflected signal, the second wireless device 200 estimates a distance between the second wireless device 200 and the reflector 300, or a distance between the first wireless device 100 and the second wireless device 200. In one exemplary embodiment, the first wireless device 100 and the second wireless device 200 transmit/receive a millimeter wave (mmWave) signal of a 60 Giga Hertz (GHz) band in a Wireless Fidelity (WiFi) scheme.

FIG. 1B is a diagram for explaining a distance measurement operation according to a second mode of the present invention.

Referring to FIG. 1B, a wireless device 100 and a wireless device 200 serve as wireless rulers or distance measurement apparatuses for measuring a distance between the wireless device 100 and the wireless device 200. The first wireless device 100 transmits a signal. The second wireless device 200 receives the signal transmitted from the first wireless device 100. Based on the received signal, the second wireless device 200 estimates a distance between the first wireless device 100 and the second wireless device 200. In one exemplary embodiment, the first wireless device 100 and the second wireless device 200 transmit/receive an mmWave signal of a 60 GHz band in a WiFi scheme.

As above, exemplary embodiments of the invention implement a wireless ruler for measuring a distance between two wireless devices (i.e., a mode 2) or measuring a distance between the wireless device and a reflector (i.e., a mode 1) in accordance with an arrangement of the two wireless devices.

In one exemplary embodiment, the wireless distance measurement apparatus according to exemplary embodiments of the invention may use Near Field Communication (NFC) to recognize the arrangement of wireless devices, and determines enabling/disabling of a distance measurement function.

In one exemplary embodiment, the wireless distance measurement apparatus according to exemplary embodiments of the invention may consider a user's grip to provide a Graphic User Interface (GUI). At this time, the GUI includes not only information about a distance but also information about a distance measurement mode and information about the accuracy of distance measurement. Also, the GUI includes a screen rotation function as well.

The wireless distance measurement apparatus according to a first mode of the invention may include an exemplary embodiment via timer synchronization, an exemplary embodiment using a sidelobe of a beam, and an exemplary embodiment concurrently transmitting two beams.

In one exemplary embodiment, the wireless distance measurement apparatus according to exemplary embodiments of the invention determines an accuracy of distance measurement by comparing a correlation peak intensity or Channel Impulse Response (CIR) peak intensity and a threshold with each other.

Figure 2A:
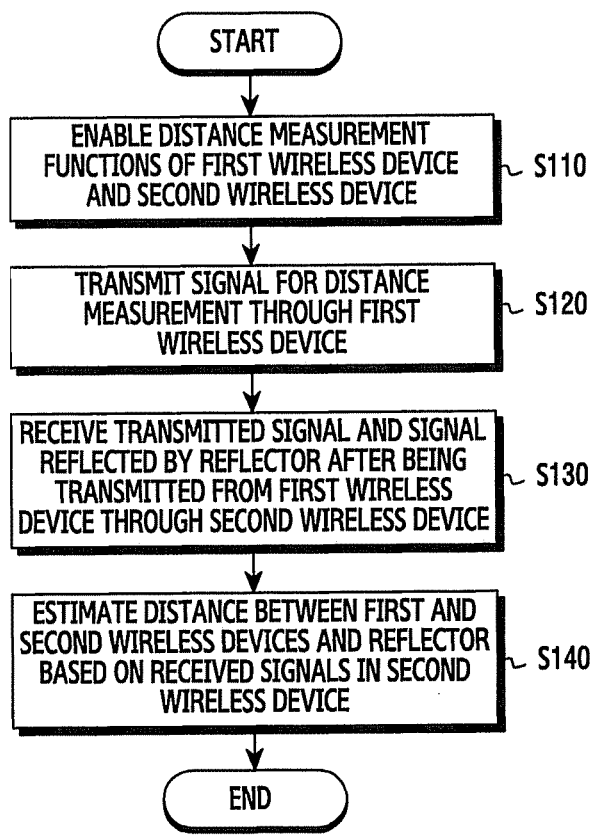
FIG. 2A is a diagram showing a process flow of a wireless distance measurement operation according to one exemplary embodiment of the present invention.

FIG. 2A is a diagram showing a process flow of a wireless distance measurement operation according to one exemplary embodiment of the present invention.

Referring to FIG. 2A, in step S110, distance measurement functions of a first wireless device 100 and a second wireless device 200 are enabled.

In one exemplary embodiment, the distance measurement functions are enabled in response to NFC modules of the first wireless device 100 and the second wireless device 200 being enabled through a contact between the first wireless device 100 and the second wireless device 200. In another exemplary embodiment, the distance measurement functions are enabled in response to a hiddenness or a blocking of a rear camera of the first wireless device 100 and a front camera of the second wireless device 200 being sensed through a contact between the first wireless device 100 and the second wireless device 200, or a hiddenness or a blocking of the rear camera of the first wireless device 100 and a rear camera of the second wireless device 200 being sensed through a contact between the first wireless device 100 and the second wireless device 200. In a further exemplary embodiment, the distance measurement functions are enabled in response to a hiddenness of a front surface of any one of the first wireless device 100 and the second wireless device 200 contacting with another of the first wireless device and the second wireless device being sensed.

In step S120, the first wireless device 100 transmits a signal for distance measurement. In step S130, the second wireless device 200 receives the first signal transmitted from the first wireless device 100, and a signal reflected by a reflector 300 after being transmitted from the first wireless device 100. In step S140, based on the received first signal and the received reflected signal, the second wireless device 200 estimates a distance between the first wireless device 100 and the reflector 300, or a distance between the second wireless device 200 and the reflector 300.

In one exemplary embodiment, the transmitted first signal of the first wireless device 100 includes a front beam signal transmitted to the front of the first wireless device 100 and a sidelobe signal of the front beam signal. The distance between the first wireless device 100 and the second wireless devices 200, and the reflector 300 is estimated based on a reception time difference between the sidelobe signal and the reflected signal. In another exemplary embodiment, the transmitted first signal of the first wireless device 100 includes a front beam signal transmitted to the front of the first wireless device 100 and a rear beam signal transmitted to the rear of the first wireless device 100. The distance between the first wireless device 100 and the second wireless devices 200, and the reflector 300 is estimated based on a reception time difference between the rear beam signal and the reflected signal. In a further exemplary embodiment, the transmitted first signal of the first wireless device 100 includes a front beam signal transmitted to the front of the first wireless device 100 and a beam signal that the first wireless device 100 transmits in the direction of the second wireless device 200. The distance between the first wireless device 100 and the second wireless devices 200, and the reflector 300 is estimated based on a reception time difference between the second wireless device direction beam signal and the reflected signal.

Figure 2B:
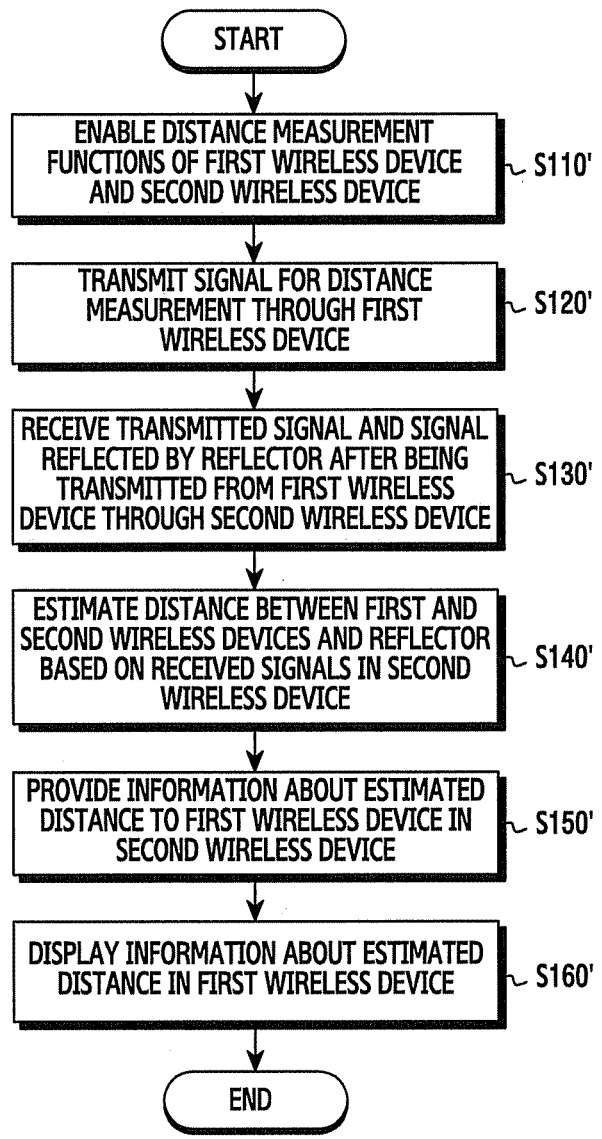
FIG. 2B is a diagram showing a process flow of a wireless distance measurement operation according to another exemplary embodiment of the present invention.

FIG. 2B is a diagram showing a process flow of a wireless distance measurement operation according to another exemplary embodiment of the present invention.

Referring to FIG. 2B, in step S110', distance measurement functions of a first wireless device 100 and a second wireless device 200 are enabled.

In one exemplary embodiment, the distance measurement functions are enabled in response to that NFC modules of the first wireless device 100 and the second wireless device 200 being enabled through a contact between the first wireless device 100 and the second wireless device 200. In another exemplary embodiment, the distance measurement functions are enabled in response to a hiddenness or a blocking of a rear camera of the first wireless device 100 and a front camera of the second wireless device 200 being sensed through a contact between the first wireless device 100 and the second wireless device 200, or a hiddenness or a blocking of the rear camera of the first wireless device 100 and a rear camera of the second wireless device 200 being sensed through a contact between the first wireless device 100 and the second wireless device 200. In a further exemplary embodiment, the distance measurement functions are enabled in response to that a hiddenness or a blocking of a front surface of one of the first wireless device 100 and the second wireless device 200 contacting with another of the first wireless device 100 and the second wireless device 200 being sensed.

In step S120', the first wireless device 100 transmits a first signal for distance measurement. In step S130', the second wireless device 200 receives the first signal transmitted from the first wireless device 100, and a signal reflected by a reflector 300 after being transmitted from the first wireless device 100. In step S140', based on the received first signal and the received reflected signal, the second wireless device 200 estimates a distance between the first wireless device 100 and the reflector 300, or a distance between the second wireless device 200 and the reflector 300.

In one exemplary embodiment, the transmitted first signal of the first wireless device 100 includes a front beam signal transmitted to the front of the first wireless device 100 and a sidelobe signal of the front beam signal. The distance between the first wireless device 100 and the second wireless device 200, and the reflector 300 is estimated based on a reception time difference between the sidelobe signal and the reflected signal. In another exemplary embodiment, the transmitted first signal of the first wireless device 100 includes a front beam signal transmitted to the front of the first wireless device 100 and a rear beam signal transmitted to the rear of the first wireless device 100. The distance between the first wireless device 100 and the second wireless device 200, and the reflector 300 is estimated based on a reception time difference between the rear beam signal and the reflected signal. In a further exemplary embodiment, the transmitted signal of the first wireless device 100 includes a front beam signal transmitted to the front of the first wireless device 100 and a beam signal that the first wireless device 100 transmits in the direction of the second wireless device 200. The distance between the first wireless device 100 and the second wireless device 200, and the reflector 300 is estimated based on a reception time difference between the second wireless device direction beam signal and the reflected signal.

In step S150', the second wireless device 200 provides information about the estimated distance to the first wireless device 100. In step S160', the first wireless device 100 externally displays the information about the estimated distance provided from the second wireless device 200.

In one exemplary embodiment, the information about the estimated distance is displayed together with numerical information in a measuring tape form. In another exemplary embodiment, the first wireless device 100 predicts the accuracy of the information about the estimated distance, and displays the predicted accuracy together with the information about the estimated distance.

Figure 2C:
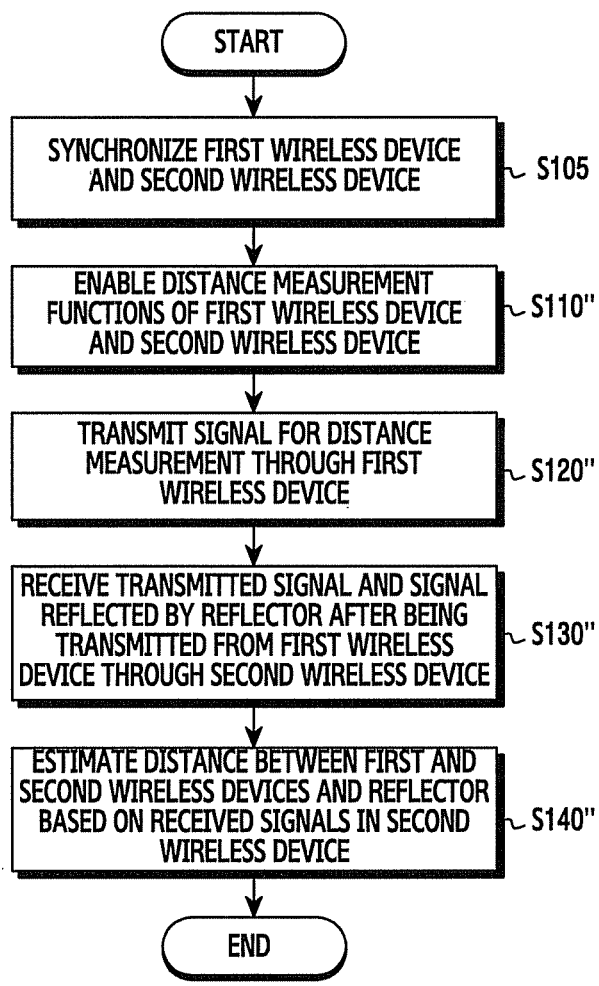
FIG. 2C is a diagram showing a process flow of a wireless distance measurement operation according to a further exemplary embodiment of the present invention.

FIG. 2C is a diagram showing a process flow of a wireless distance measurement operation according to a further exemplary embodiment of the present invention.

Referring to FIG. 2C, in step S105, one or more timers of a first wireless device 100 and a second wireless device 200 are synchronized with each other.

In step S110", distance measurement functions of a first wireless device 100 and a second wireless device 200 are enabled. In one exemplary embodiment, the distance measurement functions are enabled in response to a plurality of NFC modules of the first wireless device 100 and the second wireless device 200 being enabled through a contact between the first wireless device 100 and the second wireless device 200. In another exemplary embodiment, the distance measurement functions are enabled in response to a hiddenness or a blocking of a rear camera of the first wireless device 100 and a front camera of the second wireless device 200 being sensed through a contact between the first wireless device 100 and the second wireless device 200, or a hiddenness or a blocking of the rear camera of the first wireless device 100 and a rear camera of the second wireless device 200 being sensed through a contact between the first wireless device 100 and the second wireless device 200. In a further exemplary embodiment, the distance measurement functions are enabled in response to a hiddenness or a blocking of a front surface of one of the first wireless device 100 and the second wireless device 200 contacting with another of the first wireless device 100 and the second wireless device 200 being sensed.

In step S120", the first wireless device 100 transmits a first signal for distance measurement. In step S130", the second wireless device 200 receives the first signal transmitted from the first wireless device 100, and a signal reflected by a reflector 300 after being transmitted from the first wireless device 100. In step S140", based on the received first signal and the received reflected signals, the second wireless device 200 estimates a distance between the first wireless device 100 and the reflector 300, or a distance between the second wireless device 200 and the reflector 300.

In one exemplary embodiment, the transmitted first signal of the first wireless device 100 includes a front beam signal transmitted to the front of the first wireless device 100 and a sidelobe signal of the front beam signal. The distance between the first wireless device 100 and the second wireless device 200, and the reflector 300 is estimated based on a reception time difference between the sidelobe signal and the reflected signal. In another exemplary embodiment, the transmitted first signal of the first wireless device 100 includes a front beam signal transmitted to the front of the first wireless device 100 and a rear beam signal transmitted to the rear of the first wireless device 100. The distance between the first wireless device 100 and the second wireless device 200, and the reflector 300 is estimated based on a reception time difference between the rear beam signal and the reflected signal. In a further exemplary embodiment, the transmitted first signal of the first wireless device 100 includes a front beam signal transmitted to the front of the first wireless device 100 and a beam signal that the first wireless device 100 transmits in the direction of the second wireless device 200. The distance between the first wireless device 100 and the second wireless device 200, and the reflector 300 is estimated based on a reception time difference between the second wireless device direction beam signal and the reflected signal.

Figure 2D:
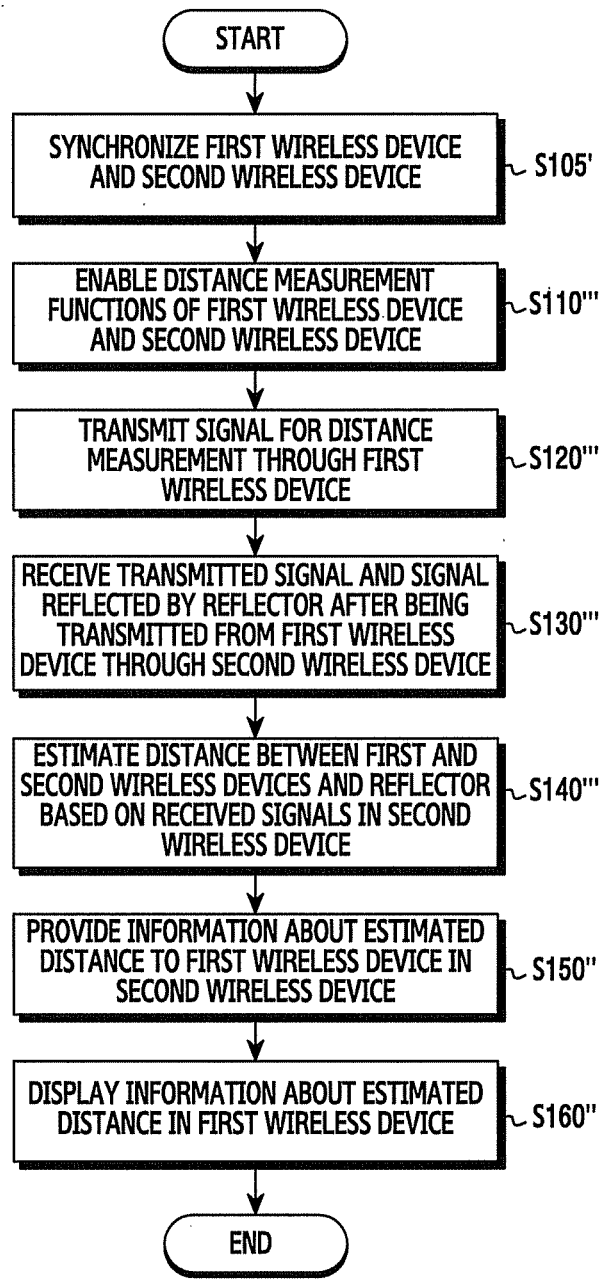
FIG. 2D is a diagram showing a process flow of a wireless distance measurement operation according to a yet another exemplary embodiment of the present invention.

FIG. 2D is a diagram showing a process flow of a wireless distance measurement operation according to a yet another exemplary embodiment of the invention. For example, this process flow may be performed between the first wireless device 100 and the second wireless device 200 illustrated in FIG. 1A.

Referring to FIG. 2D, in step S105', the first wireless device 100 and the second wireless device 200 are synchronized with each other.

In step S110''', distance measurement functions of a first wireless device 100 and a second wireless device 200 are enabled.

In one exemplary embodiment, the distance measurement functions are enabled in response to NFC modules of the first wireless device 100 and the second wireless device 200 being enabled by a contact between the first wireless device 100 and the second wireless device 200. In another exemplary embodiment, the distance measurement functions are enabled in response to a hiddenness or a blocking of a rear camera of the first wireless device 100 and a front camera of the second wireless device 200 being sensed through a contact between the first wireless device 100 and the second wireless device 200, or a hiddenness or a blocking of the rear camera of the first wireless device 100 and a rear camera of the second wireless device 200 being sensed through a contact between the first wireless device 100 and the second wireless device 200. In a further exemplary embodiment, the distance measurement functions are enabled in response to a hiddenness or a blocking of a front surface of one of the first wireless device 100 and the second wireless device 200 contacting with another one of the first wireless device 100 and the second wireless device 200 being sensed.

In step S120''', the first wireless device 100 transmits a first signal for distance measurement. In step S130''', the second wireless device 200 receives the first signal transmitted from the first wireless device 100, and a signal reflected by a reflector 300 after being transmitted from the first wireless device 100. In step S140''', based on the received first signal and the received reflected signal, the second wireless device 200 estimates a distance between the first wireless device 100 and the reflector 300, or a distance between the second wireless device 200 and the reflector 300.

In one exemplary embodiment, the transmitted first signal of the first wireless device 100 includes a front beam signal transmitted to the front of the first wireless device 100 and a sidelobe signal of the front beam signal. The distance between the first and second wireless devices 100 and 200 and the reflector 300 is estimated based on a reception time difference between the sidelobe signal and the reflected signal. In another exemplary embodiment, the transmitted first signal of the first wireless device 100 includes a front beam signal transmitted to the front of the first wireless device 100 and a rear beam signal transmitted to the rear of the first wireless device 100. The distance between the first wireless device 100 and the second wireless device 200, and the reflector 300 is estimated based on a reception time difference between the rear beam signal and the reflected signal. In a further exemplary embodiment, the transmitted first signal of the first wireless device 100 includes a front beam signal transmitted to the front of the first wireless device 100 and a beam signal that the first wireless device 100 transmits in the direction of the second wireless device 200. The distance between the first wireless device 100 and the second wireless device 200, and the reflector 300 is estimated based on a reception time difference between the second wireless device direction beam signal and the reflected signal.

In step S150'', the second wireless device 200 provides information about the estimated distance to the first wireless device 100. In step S160'', the first wireless device 100 externally displays the information about the estimated distance provided from the second wireless device 200.

In one exemplary embodiment, the information about the estimated distance is displayed together with numerical information in a measuring tape form. In another exemplary embodiment, the first wireless device 100 predicts the accuracy of the information about the estimated distance, and displays the predicted accuracy together with the information about the estimated distance.

FIG. 4 to FIG. 13 to be described later correspond to examples of achieving NFC connection by contacting the first wireless device 100 and the second wireless device 200, thereby performing a distance measurement operation. In another exemplary embodiment, the distance measurement operation may be carried out in response to that the hiddenness or the blocking of a camera installed in a wireless device is sensed (FIG. 14) or the hiddenness or the blocking of a front surface of the wireless device is sensed (FIG. 15).

Figure 3:
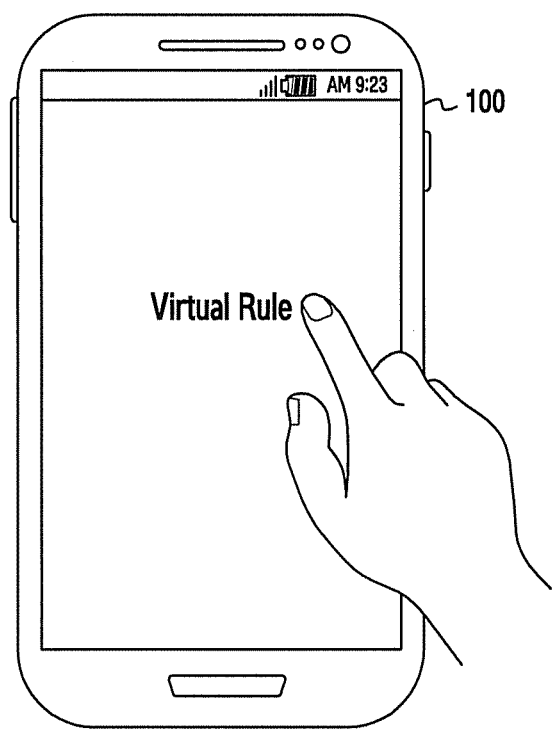
FIG. 3 is a diagram showing an operation of executing a distance measurement application (app) of a first wireless device in accordance with one exemplary embodiment of the present invention.

FIG. 3 is a diagram showing an operation of executing a distance measurement app of the first wireless device 100 in accordance with one exemplary embodiment of the invention.

Referring to FIG. 3, the distance estimation app of the first wireless device 100, which may be a virtual ruler app, is executed by a user. In this case, it is assumed that NFC modules of the first wireless device 100 and the second wireless device 200 have been enabled, and the second wireless device 200 executes an app or supports only a distance measurement protocol without executing the app.

Figure 4:
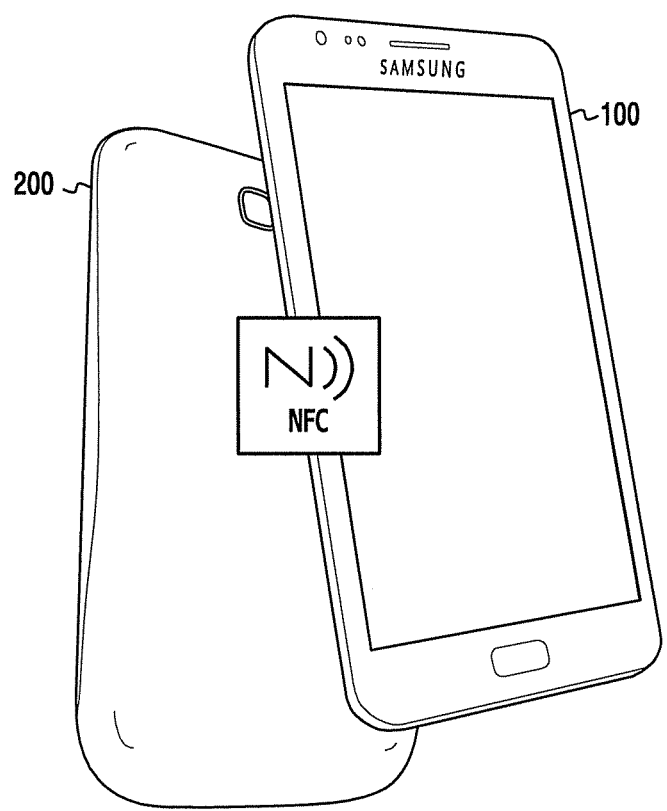
FIG. 4 is a diagram showing an operation of contacting rear surfaces of a first wireless device and a second wireless device with each other and connecting them by Near Field Communication (NFC) in accordance with one exemplary embodiment of the present invention.

FIG. 4 is a diagram showing an operation of contacting rear surfaces of a first wireless device and a second wireless device, respectively, with each other and connecting them by NFC in accordance with one exemplary embodiment of the present invention.

Referring to FIG. 4, distance measurement modules of the first wireless device 100 being an initiator and the second wireless device 200 being a responder are enabled by the NFC connection. In accordance with the enabling of the distance measurement modules, the first wireless device 100 and the second wireless device 200 transmit/receive a signal (e.g., a 60 GHz signal) for a distance measurement operation.

Also, a distance measurement app of the second wireless device 200 is invoked by the NFC connection. In another exemplary embodiment, even when the second wireless device 200 has no distance measurement app, the second wireless device 200 may perform the distance measurement operation.

Figure 5:
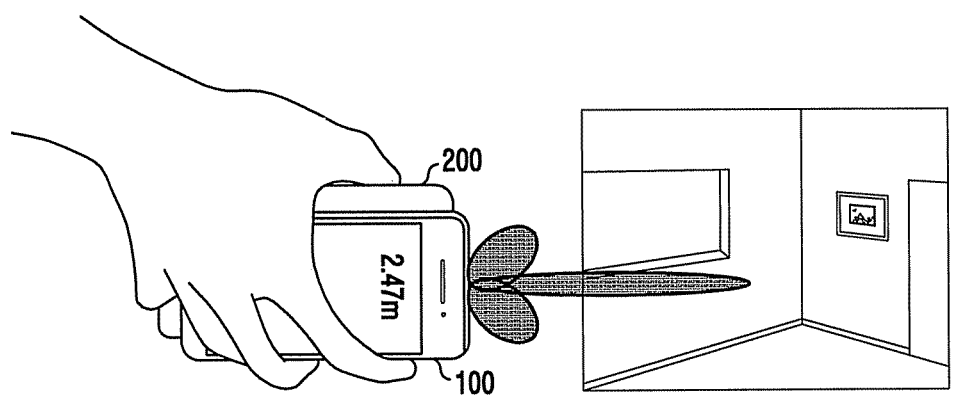
FIG. 5 is a diagram showing a wireless distance measurement operation according to one exemplary embodiment of the present invention.

FIG. 5 is a diagram showing a wireless distance measurement operation according to one exemplary embodiment of the invention. This exemplary embodiment corresponds to a wireless distance measurement operation according to a first mode of the present invention as illustrated in FIG. 1A.

Referring to FIG. 5, in a state where a user contacts and holds both a first wireless device 100 and a second wireless device 200 with a natural grip, the first wireless device 100 and the second wireless device 200 fix upper and central beams among a plurality of transmission/reception beams as a beam for signal transmission/reception.

For the sake of distance measurement, the first wireless device 100 transmits a tone or correlation signal. The second wireless device 200 receives a signal reflected through a reflector (e.g., the wall 300) after being transmitted from the first wireless device 100, and measures a round-trip time. The second wireless device 200 uses the measured round-trip-time to estimate a distance from the second wireless device 200 or the first wireless device 100 to the reflector.

Figure 6:
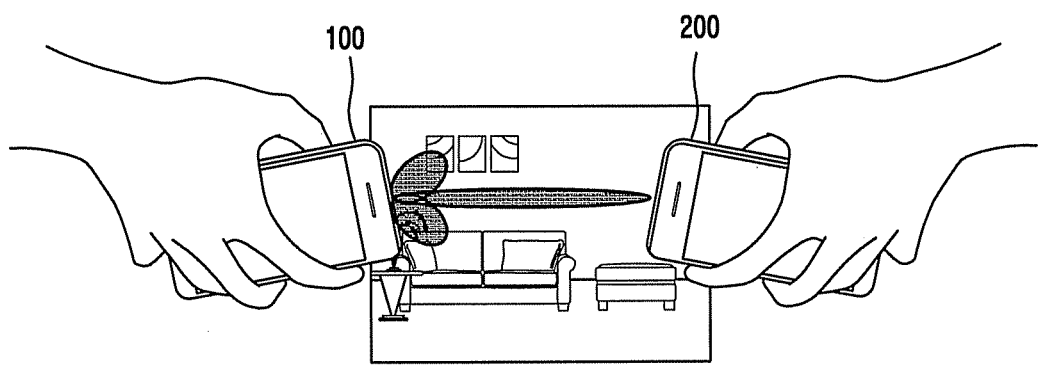
FIG. 6 is a diagram showing a wireless distance measurement operation according to another exemplary embodiment of the present invention.

FIG. 6 is a diagram showing a wireless distance measurement operation according to another exemplary embodiment of the present invention. This exemplary embodiment corresponds to a wireless distance measurement operation according to a second mode of the present invention as illustrated in FIG. 1B.

Referring to FIG. 6, if a user separately holds a first wireless device 100 and a second wireless device 200 in a measuring tape form, a beamforming operation of the first wireless device 100 and the second wireless device 200 is driven. In this state, the first wireless device 100 transmits a first signal to the second wireless device 200, and the second wireless device 200 receives the first signal transmitted from the first wireless device 100. Based on the received first signal, the second wireless device 200 estimates a distance between the first wireless device 100 and the second wireless device 200. The first wireless device 100 may also receive a signal reflected from the second wireless device 200 after being transmitted from the first wireless device 100, and measures a round-trip-time. The first wireless device 100 uses the measured round-trip-time to estimate the distance from the first wireless device 100 to the second wireless device 200.

FIG. 7A to FIG. 7F are diagrams showing examples of a user screen displaying one or more wireless distance measurement operations according to exemplary embodiments of the invention. These examples are merely illustrations, they should not be construed as limiting.

Figure 7A:
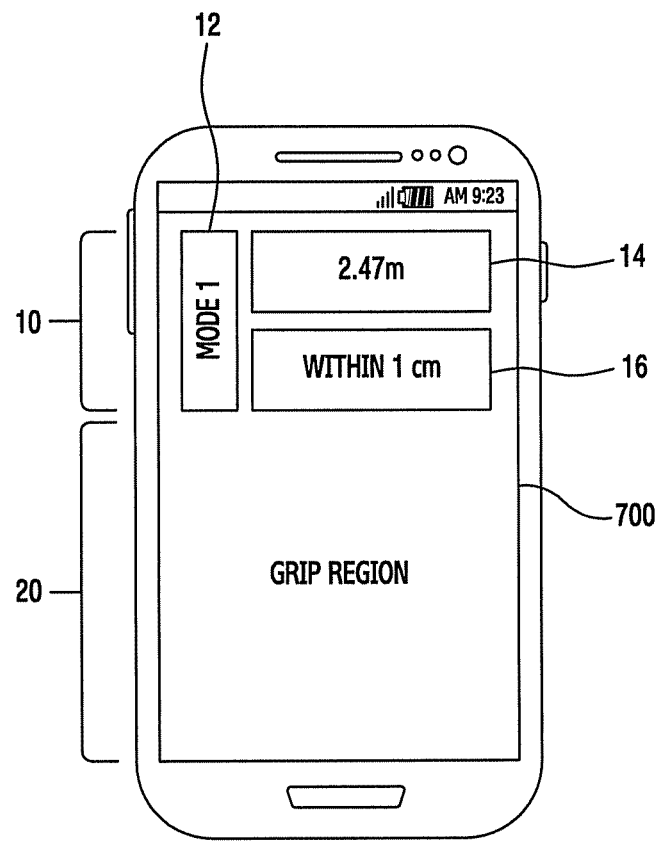
FIG. 7A to FIG. 7F are diagrams showing examples of a user screen displayed at wireless distance measurement operation according to exemplary embodiments of the present invention.

Referring to FIG. 7A, distance measurement result information is displayed on a display 700 having a main region 10 and an adjacent a grip region 20. The main region 10, which displays the distance measurement result information, may include a region 12 for displaying mode information, a region 14 for displaying distance information, and a region 16 for displaying accuracy (or reliability) information of the measured distance information. In one exemplary embodiment, the distance measurement result information may be also displayed on the first wireless device 100, with the first wireless device 100 being an initiator. In another exemplary embodiment, the distance measurement result information may be also displayed on the second wireless device 200, with the second wireless device 200 being a responder. In a further exemplary embodiment, the distance measurement result information may be also displayed on both the first wireless device 100 and the second wireless device 200.

In FIG. 7A, a wireless device (e.g., the wireless device 100 of FIG. 1) determines an accuracy (or reliability) level to be displayed in the region 16, by comparing a Channel Impulse Response (CM) peak or correlation peak intensity and one or more threshold values. For example, when two threshold values are used, if a peak value exceeds a first threshold value (or critical value), the highest accuracy (or reliability) level is shown as an experimental numerical value. If the peak value is less than the first threshold value or is greater than a second threshold value, a middle accuracy (or reliability) level is shown as the experimental numerical value. If the peak value is less than the second threshold value, it may correspond to a situation in which accuracy (or reliability) measurement is impossible. In some embodiments, for a consistent comparison of the peak value, a normalized value is used for a channel impulse response or correlation value.

Figure 7B:
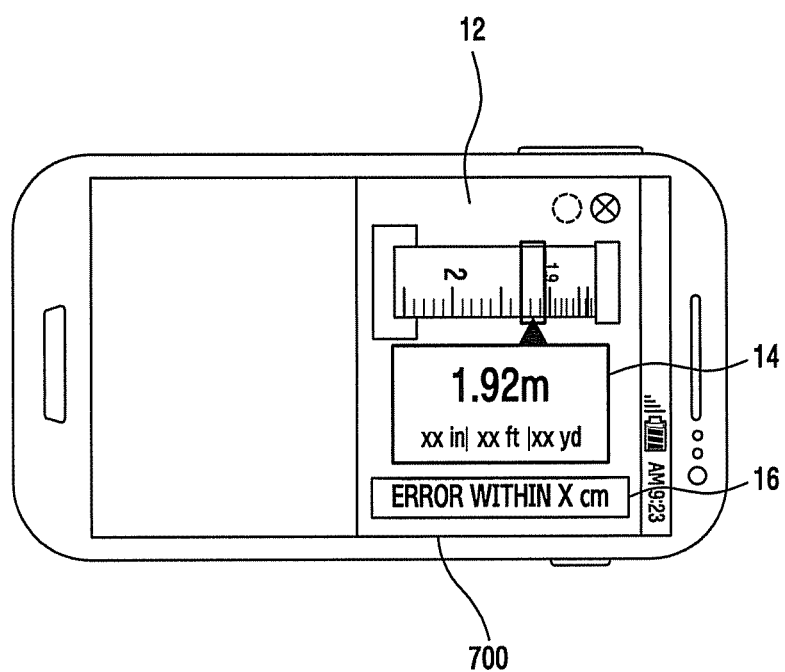
Figure 7C:
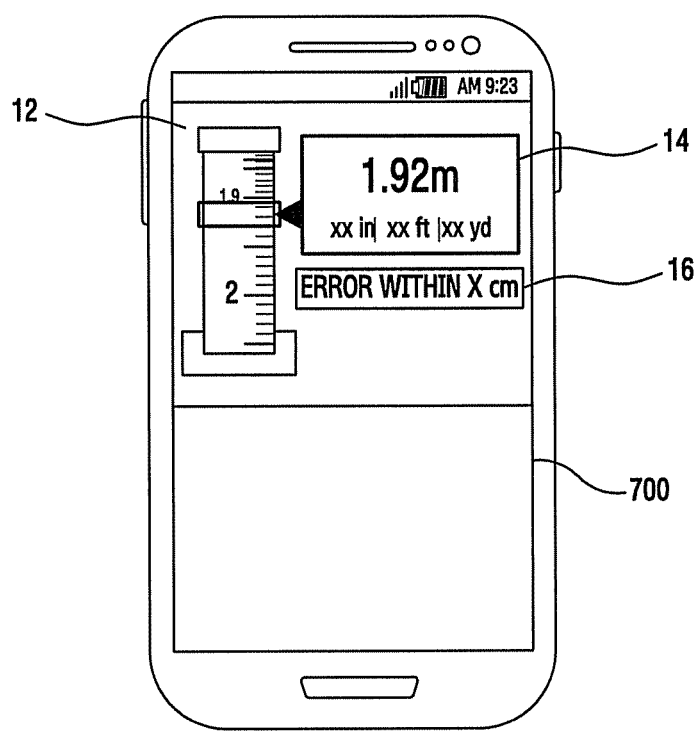

Referring to FIG. 7B and FIG. 7C, display on the display 700 may be different depending on an orientation of the wireless device. For example, when the user holds the wireless device horizontally, the wireless distance measurement result information may be displayed in a right portion in region 12 of the display 700. In contrast, when the user holds the wireless device vertically, the wireless distance measurement result information may be displayed in a top portion in region 12 of the display 700. Operation of rotating the display 700 in accordance with an orientation of the wireless device may be implemented by using an acceleration sensor or accelerometer (not shown) of the wireless device.

Figure 7D:
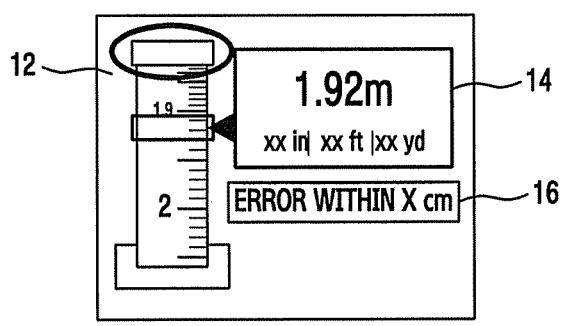
Figure 7E:
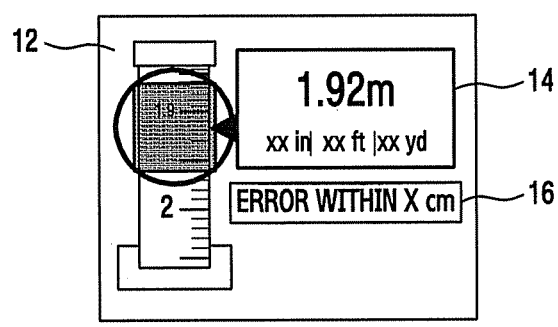

Referring to FIG. 7D and FIG. 7E, in one exemplary embodiment, the distance measurement result information as displayed in region 12 may be displayed in a measuring tape format. Because the distance measurement result information 12 is displayed in the measuring tape form, it is possible to check an increase of a distance from a short range while measuring the distance. In one exemplary embodiment, in case that a user performs distance measurement while getting distant from a wall surface, the distance measurement result information is displayed in a form of scaling up a measuring tape. In another exemplary embodiment, in case that the user performs distance measurement while approaching the reflector (e.g., the wall 300), the distance measurement result information is displayed in a form of scaling down the measuring tape. In a further exemplary embodiment, the distance measurement result information may be displayed in a form in which color is varied with a change of the distance. The varying of the color of the displayed distance measurement result information as above may result in the improvement of recognizability.

The distance measurement result information as displayed in region 12 of the measuring tape form may be different according to an operating mode or mode. In one exemplary embodiment, in case that a distance measurement operation of a second mode is performed, the distance measurement result information 12 is displayed as illustrated in FIG. 7D. In another exemplary embodiment, in case that a distance measurement operation of a first mode is performed, the distance measurement result information as displayed in region 12 is displayed as illustrated in FIG. 7E. In a further exemplary embodiment, the color may be displayed differently according to the operating mode. The varying of the color of the displayed distance measurement result information as discussed above may result in the improvement of recognizability.

In one exemplary embodiment, the distance measurement result information may be displayed in region 14 as numerical information. The unit (i.e., meter (m), inch (in), feet (ft), and yard (yd)) of the numerical information as displayed in region 14 may be previously selected and/or set by a user. The conversion of the unit may be achieved by user's selection as well.

Referring also to FIG. 7D and FIG. 7E, information about the accuracy (or reliability) of the distance measurement result information may be further displayed in region 16. In one exemplary embodiment, the accuracy of the distance measurement result information may be expressed in three steps (e.g., 1 cm/10 cm/malfunction). This expression makes it possible to intuitively display the accuracy of a distance measurement result.

Figure 7F:
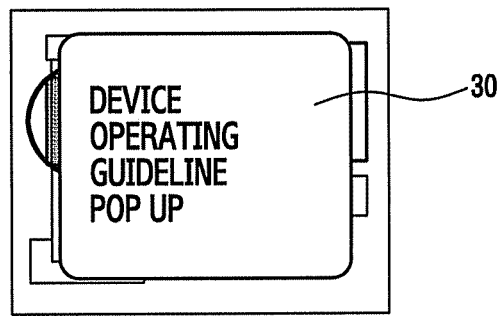

Referring to FIG. 7F, a device operating guideline is displayed in a pop-up window 30. This display is achieved in case that a wireless device and a reflector or wireless devices are not in Line-Of-Sight (LOS) or are in Non-Line-Of-Sight (NLOS). In such cases, a message of "Check if an obstacle exists between devices" or "Check if devices face each other" may be displayed.

Figure 8:
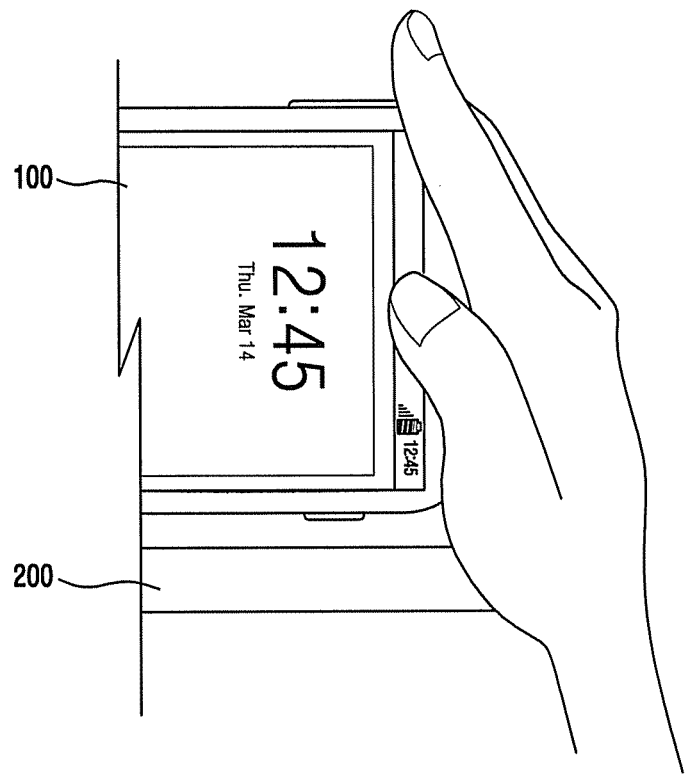
FIG. 8 is a diagram for showing an operation of correcting a timer offset between wireless devices at wireless distance measurement operation according to one exemplary embodiment of the present invention.
Figure 8:
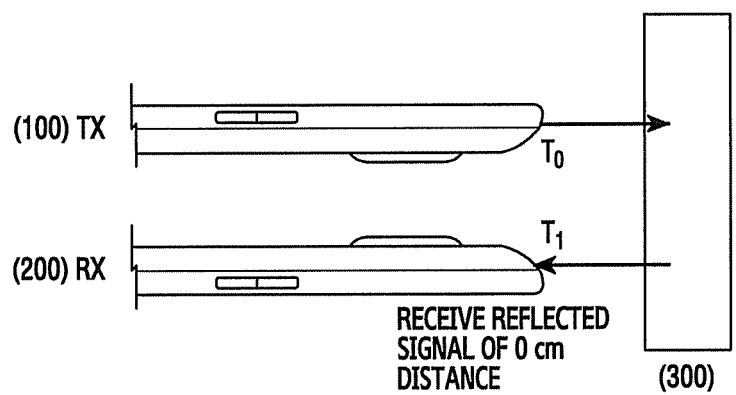

FIG. 8 is a diagram showing an operation of correcting a timer offset between wireless devices at a wireless distance measurement operation according to one exemplary embodiment of the invention.

Referring to FIG. 8, in a calibration mode, a user hides or blocks an upper end (or the direction of traveling of a distance measurement beam) of two wireless devices with the reflector 300 (e.g., a hand, a wall, a desk, etc.) while simultaneously holding the first wireless device 100 and the second wireless device 200 with one hand. The distance measurement beam is transmitted from the first wireless device 100 at a time point of 'T0'. The transmitted signal is reflected at a distance of 0 cm from the first wireless device 100 through the reflector and then is received by the second wireless device 200 at a time point of 'T1'. If timers of the first wireless device 100 and the second wireless device 200 are synchronized, T0 should equal to T1. Accordingly, the first wireless device 100 or the second wireless device 200 may be compensated or calibrated a local timer value with an offset, which may be a time difference having an absolute value of (T1−T0).

In one exemplary embodiment, the first wireless device 100 may add the absolute value of (T1−T0) to correct a local timer, or a timer offset. In another exemplary embodiment, the second wireless device 200 subtracts the absolute value of (T1−T0) to correct a local timer, or a timer offset. In a further exemplary embodiment, instead of correcting the timer offset, the distance estimation operation may determine both the offset and estimate the distance.

FIG. 9 to FIGS. 11A and 11B are diagrams showing exemplary embodiments of a wireless distance estimation operation according to a first mode of the present invention. Each exemplary embodiment may be suitably selected and used according to an implementation situation such as antenna mounting.

Figure 9:
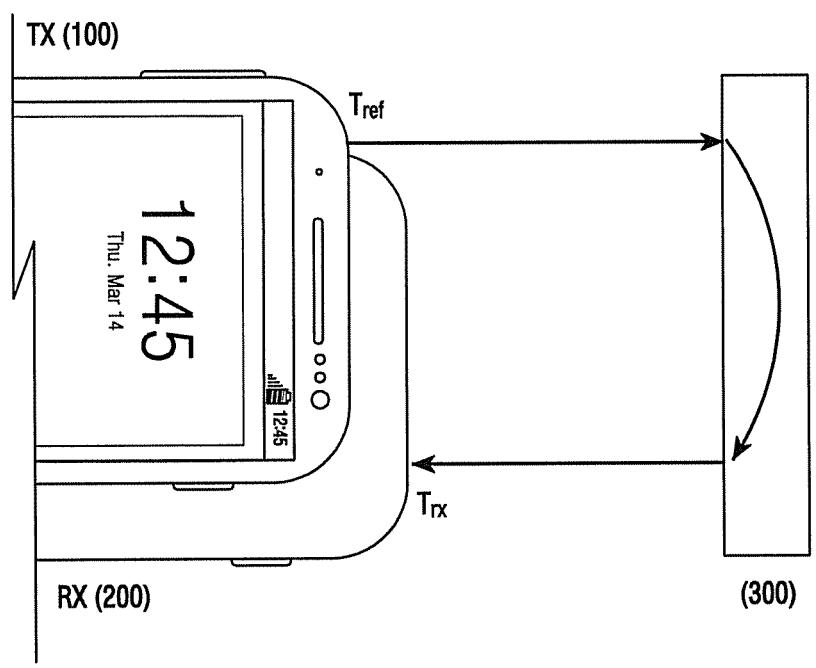
FIG. 9 is a diagram showing one exemplary embodiment of a wireless distance estimation operation according to a first mode of the present invention.

FIG. 9 is a diagram showing one exemplary embodiment of a wireless distance estimation operation according to a first mode of the present invention.

Referring to FIG. 9, this exemplary embodiment corresponds to an operation when a first wireless device 100 and a second wireless device 200 are aware of the same absolute time through timer synchronization. For example, the first wireless device 100 and the second wireless device 200 may perform a distance estimation operation when a timer synchronization has an offset level between 3 ps (i.e., 1 mm) and 10 ps (i.e., 3 mm).

In a state where device-to-device timers of respective first wireless device 100 and second wireless device 200 are synchronized, the first wireless device 100 transmits a beam at a first time point ($T_{ref}$). The second wireless device 200 receives the beam reflected from the reflector 300 and then, records a second time point ($T_{rx}$). The '$T_{rx}$' is a time point at which a pulse is received by the second wireless device 200 or a time point at which a correlation peak is detected. The first wireless device 100 or the second wireless device 200 obtains a time taken for an electronic wave to reach the reflector 300 by ($T_{rx}-T_{ref}$)/2, and uses the obtained time to estimate a distance between the first wireless device 100 and the second wireless device 200.

In one exemplary embodiment, the first time point ($T_{ref}$) may be predefined.

In one exemplary embodiment, the first wireless device 100 only forwards a beam or other frame to the second wireless device 200 at the first time point ($T_{ref}$). In this way, the second wireless device 200 may estimate a distance between the first wireless device 100 and the second wireless device 200.

In another exemplary embodiment, after receiving information about a second time point ($T_{rx}$) from the second wireless device 200, the first wireless device 100 may use the first time point ($T_{ref}$) previously known or determined to estimate a distance between the first wireless device 100 and the second wireless device 200.

Figure 10A:
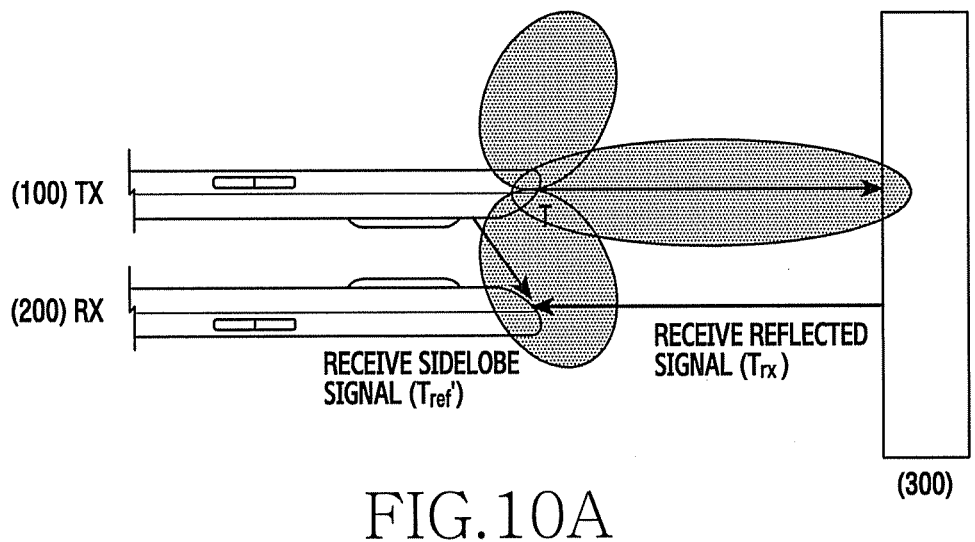
FIG. 10A and FIG. 10B are diagrams showing another exemplary embodiment of a wireless distance estimation operation according to a first mode of the present invention.
Figure 10B:
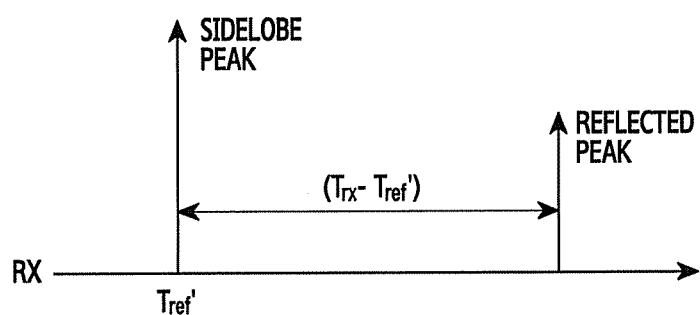

FIG. 10A and FIG. 10B are diagrams showing another exemplary embodiment of a wireless distance estimation operation according to a first mode of the present invention. This exemplary embodiment may be applied when timer synchronization or timer correction of wireless devices is unavailable.

Referring to FIG. 10A and FIG. 10B, this exemplary embodiment may be applied when the second wireless device 200 receives a sidelobe of a beam transmitted from the first wireless device 100.

The first wireless device 100 transmits a beam at a time point ($T_{ref}$).

After receiving a sidelobe signal of a transmission beam at a time point ($T_{ref}'$) after the time point ($T_{ref}$), the second wireless device 200 receives a reflected wave going through the reflector 300.

The second wireless device 200 obtains a ($T_{rx}-T_{ref}'$)/2 value as a phase difference of received two signals (or pulses) or a phase difference of two correlation peaks, and uses this phase difference to estimate a distance with the reflector 300.

The second wireless device 200 forwards information about the estimated distance to the first wireless device 100. When received, the first wireless device 100 externally displays the information about the estimated distance. In another exemplary embodiment, the second wireless device 200 may also externally display the information about the estimated distance.

Figure 11A:
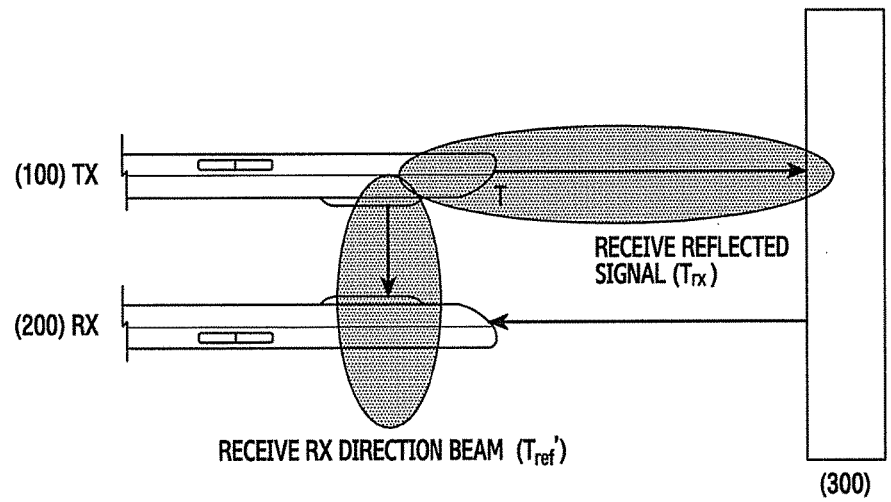
FIG. 11A and FIG. 11B are diagrams showing a further exemplary embodiment of a wireless distance estimation operation according to a first mode of the present invention.
Figure 11B:
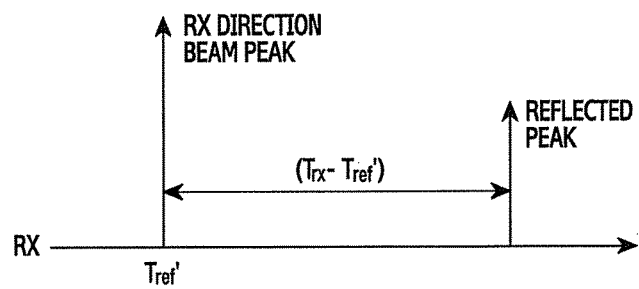

FIG. 11A and FIG. 11B are diagrams showing a further exemplary embodiment of a wireless distance estimation operation according to a first mode of the invention. In this exemplary embodiment, a distance estimation operation may be applied where a sidelobe signal at a rear surface of an upper end of a wireless device in view of antenna arrangement is unavailable.

Referring to FIG. 11A and FIG. 11B, at a time point ($T_{ref}$), the first wireless device 100 transmits a beam from the front of the first wireless device 100 and concurrently toward the second wireless device 200 (or toward a rear surface of the second wireless device 200, or omni-directionally toward the second wireless device 200). For this operation, the first wireless device 100 concurrently enables a corresponding antenna chain.

After receiving a rear beam at a time point ($T_{ref}'$) after the time point ($T_{ref}$), the second wireless device 200 receives a reflected wave signal via the reflector 300.

The second wireless device 200 obtains a ($T_{rx}-T_{ref}'$)/2 value as a phase difference of received two signals (or pulses) or a phase difference of two correlation peaks, and uses this phase difference to estimate a distance with the reflector 300.

The second wireless device 200 forwards information about the estimated distance to the first wireless device 100. When received, the first wireless device 100 externally displays the information about the estimated distance. In another exemplary embodiment, the second wireless device 200 may also externally display the information about the estimated distance.

Figure 12:
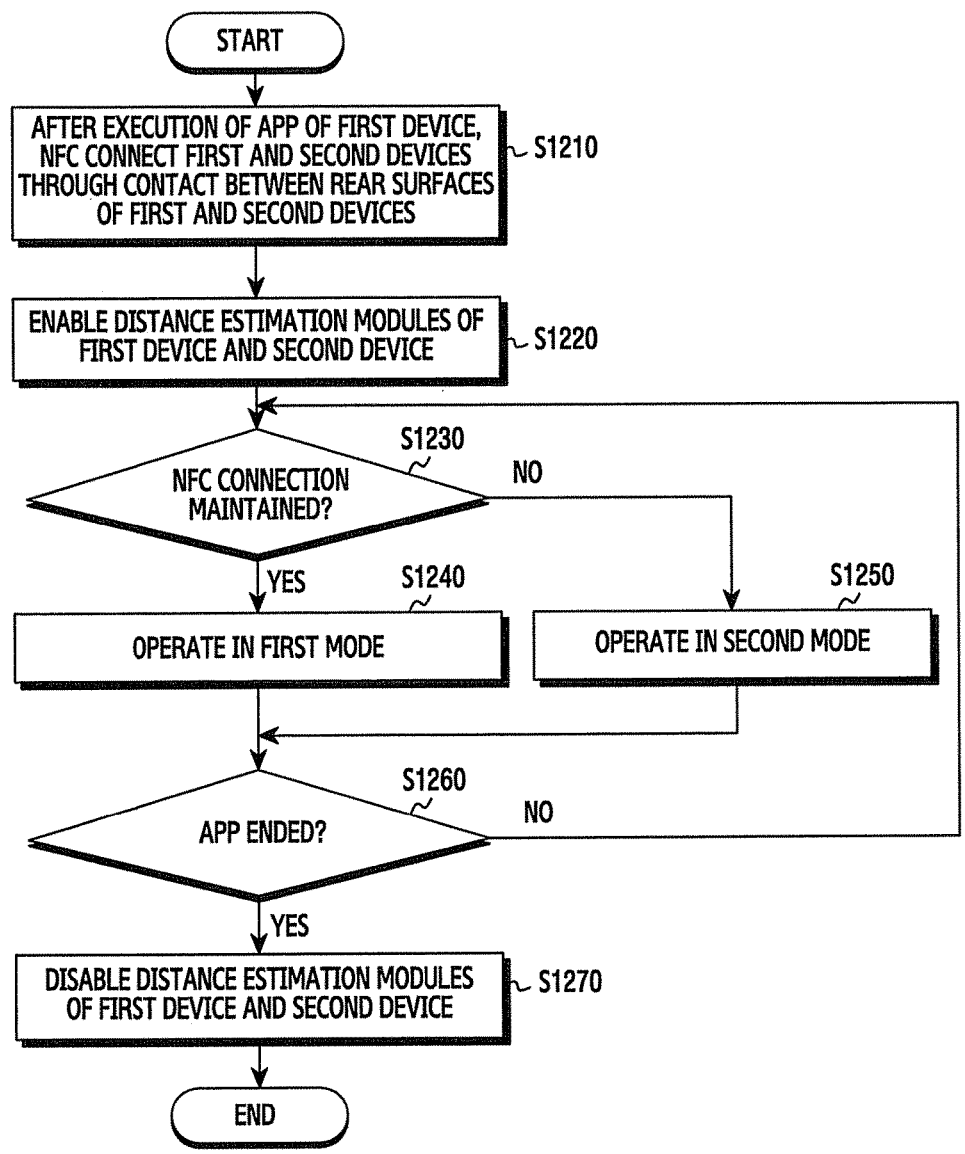
FIG. 12 is a diagram showing a process flow of a wireless distance estimation operation according to one exemplary embodiment of the present invention.
Figure 13:
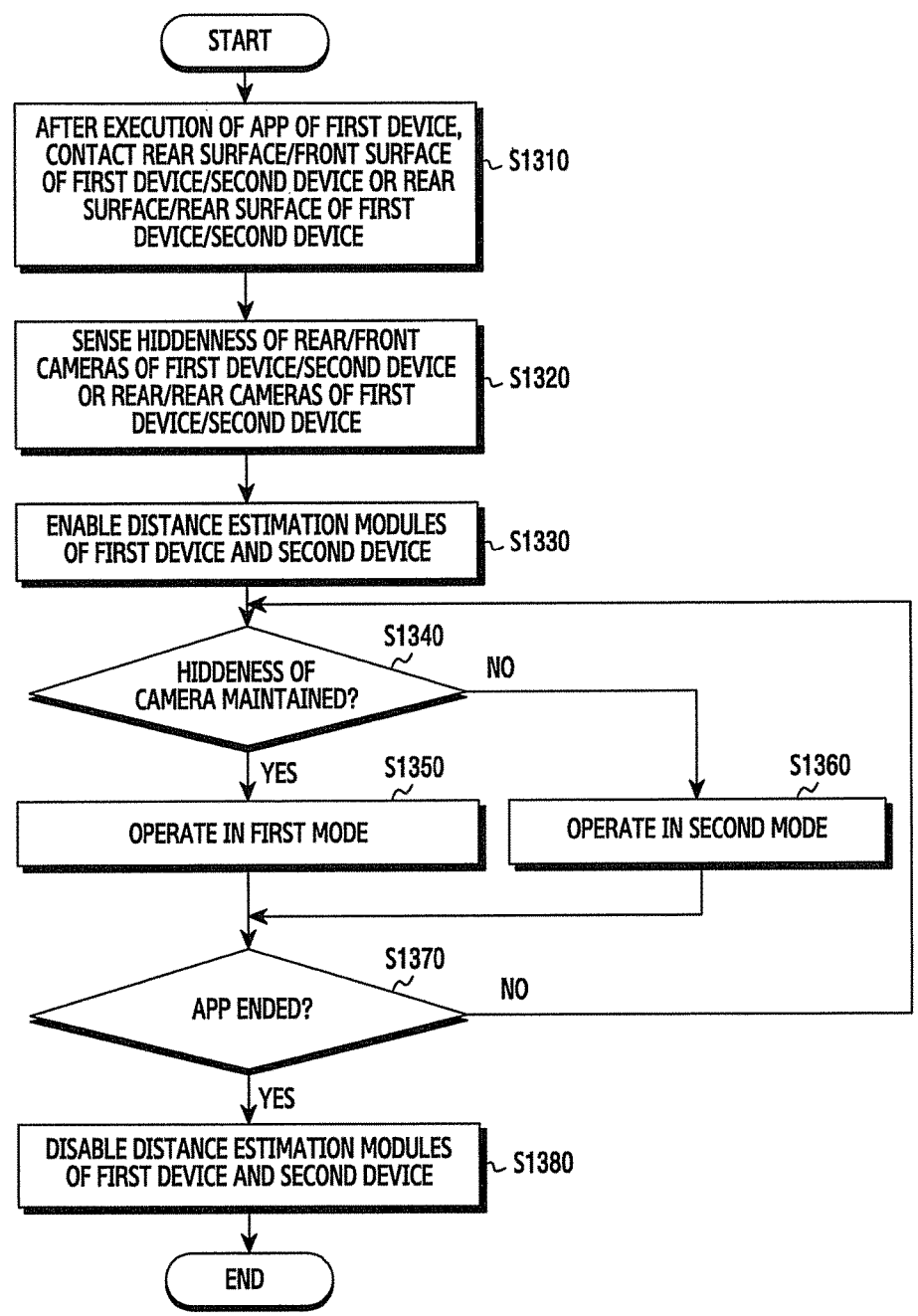
FIG. 13 is a diagram showing a process flow of a wireless distance estimation operation according to another exemplary embodiment of the present invention.
Figure 14:
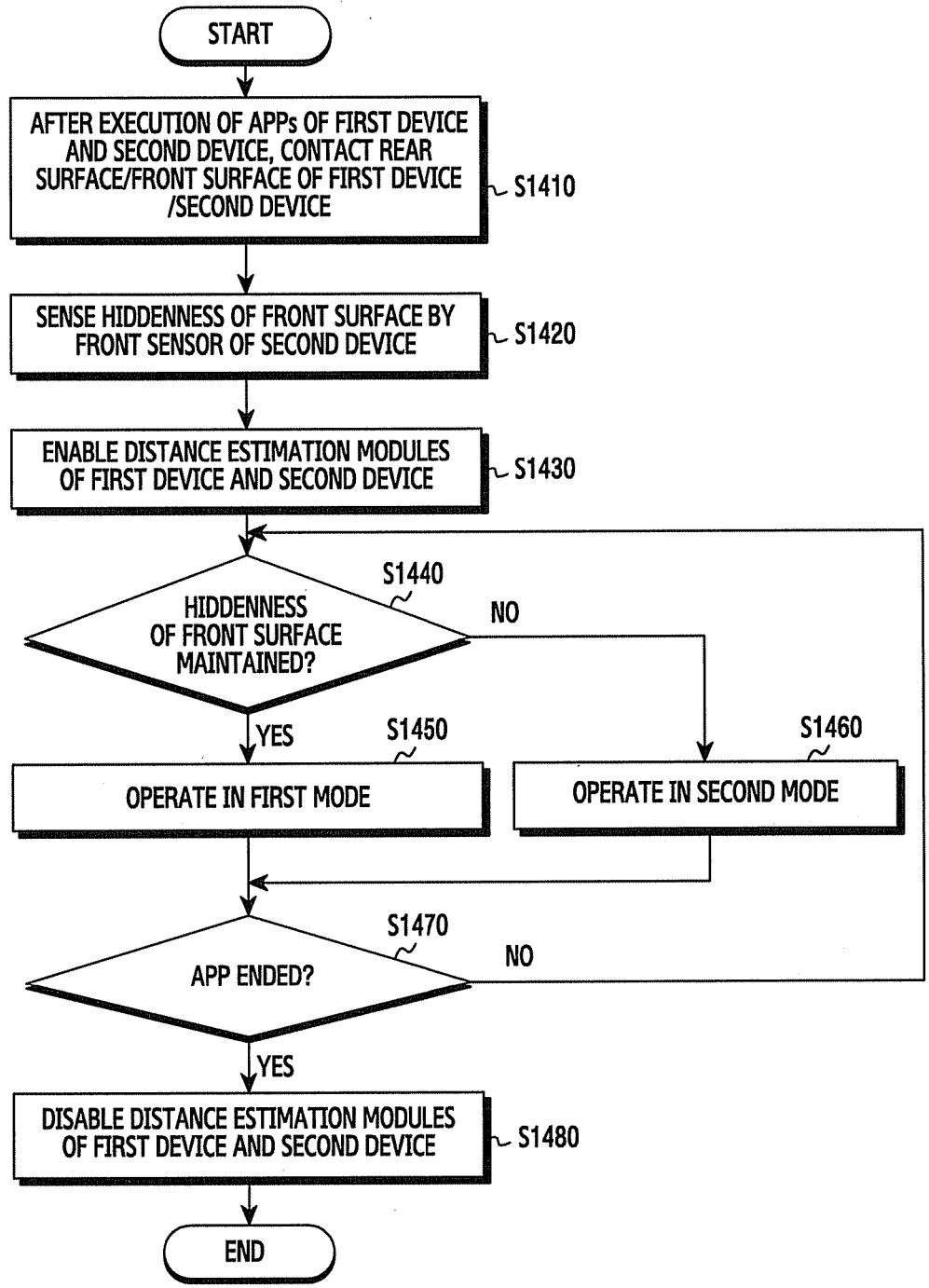
FIG. 14 is a diagram showing a process flow of a wireless distance estimation operation according to a further exemplary embodiment of the present invention.
Figure 15:
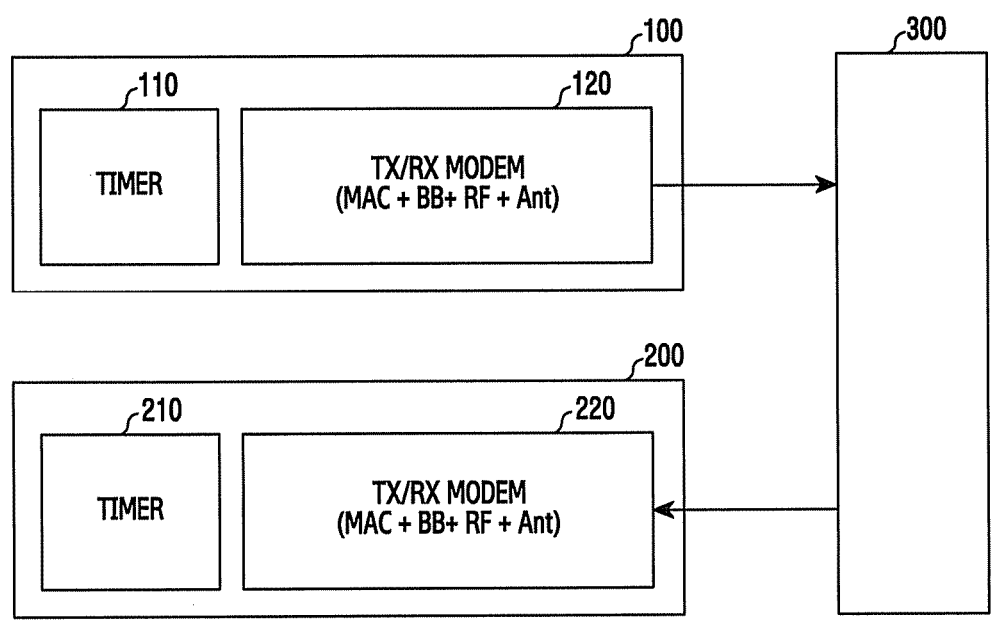
FIG. 15 is a diagram showing a timer measurement between wireless devices for a wireless distance estimation operation according to a first mode of the present invention.

FIG. 12 to FIG. 14 are diagrams showing process flows of wireless distance estimation operations according to exemplary embodiments of the invention. These process flows show different wireless distance estimation operations in view of enabling wireless devices differently. In one exemplary embodiment, the first wireless device 100 and the second wireless device 200 are enabled through NFC connection (FIG. 12). In another exemplary embodiment, when a hiddenness or a blocking of a rear camera of the first wireless device 100 and a front camera of the second wireless device 200 is sensed, or when a hiddenness or a blocking of the rear camera of the first wireless device 100 and a rear camera of the second wireless device 200 is sensed, the first wireless device 100 and the second wireless device 200 are enabled (FIG. 13). In another exemplary embodiment, when a hiddenness or a blocking of the front of the second wireless device 200 is sensed, the first wireless device 100 and the second wireless device 200 are enabled (FIG. 14). Because exemplary embodiments illustrated in FIG. 13 and FIG. 14 may perform distance measurement operations by a front surface/rear surface of wireless devices, not a rear surface/rear surface of the wireless devices, the antenna arrangement of the wireless devices may be consistent.

Referring to FIG. 12, in step S1210, after execution of a wireless distance measurement app on the first wireless device 100, NFC connection between the first wireless device 100 and the second wireless device 200 is established through a contact between a rear surface of the first wireless device 100 and a rear surface of the second wireless device

200. As the NFC connection between the first wireless device 100 and the second wireless device 200 is established, in step S1220, distance estimation modules of the first wireless device 100 and the second wireless device 200 are enabled.

In step S1230, the first wireless device 100 and the second wireless device 200 determine whether the NFC connection is maintained. If it is determined that the NFC connection is maintained, in step S1240, the first wireless device 100 and the second wireless device 200 operate in a first mode. If it is determined that the NFC connection is not maintained, in step S1250, the first wireless device 100 and the second wireless device 200 operate in a second mode.

In step S1260, the first wireless device 100 and the second wireless device 200 determine whether the wireless distance measurement app has ended. If it is determined that the wireless distance measurement app has not ended, the first wireless device 100 and the second wireless device 200 returns to step S1230. If it is determined that the wireless distance measurement app has ended, in step S1270, the first wireless device 100 and the second wireless device 200 disable the distance estimation modules and end the wireless distance estimation operation.

Referring to FIG. 13, in step S1310, after execution of wireless distance measurement apps of the first wireless device 100 and the second wireless device 200, a rear surface of the first wireless device 100 and a front surface of the second wireless device 200 are contacted with each other or the rear surface of the first wireless device 100 and a rear surface of the second wireless device 200 are contacted with each other. Through this contact, in step S1320, a hiddenness or a blocking of a rear camera of the first wireless device 100 and a front camera of the second wireless device 200 is sensed or a hiddenness or a blocking of the rear camera of the first wireless device 100 and a rear camera of the second wireless device 200 is sensed. As the hiddenness or the blocking is sensed in step S1320, in step S1330, distance estimation modules of the first wireless device 100 and the second wireless device 200 are enabled.

In step S1340, the first wireless device 100 and the second wireless device 200 determine whether the hiddenness of step S1320 is maintained. If it is determined that the hiddenness is maintained, in step S1350, the first wireless device 100 and the second wireless device 200 operate in a first mode. If it is determined that the hiddenness is not maintained, in step S1360, the first wireless device 100 and the second wireless device 200 operate in a second mode.

In step S1370, the first wireless device 100 and the second wireless device 200 determine whether the wireless distance measurement apps have ended. If it is determined that the wireless distance measurement apps have not ended, the first wireless device 100 and the second wireless device 200 returns to step S1340. If it is determined that the wireless distance measurement apps have ended, in step S1380, the first wireless device 100 and the second wireless device 200 disable the distance estimation modules and end the wireless distance estimation operation.

Referring to FIG. 14, in step S1410, after execution of wireless distance measurement apps of the first wireless device 100 and the second wireless device 200, a rear surface of the first wireless device 100 and a front surface of the second wireless device 200 are contacted with each other. Through this contact, in step S1420, a hiddenness or a blocking of the front surface of the second wireless device 200 is sensed by a front sensor or camera of the second wireless device 200. As the hiddenness or the blocking of the front surface is sensed in step S1420, in step S1430, distance estimation modules of the first wireless device 100 and the second wireless device 200 are enabled.

In step S1440, the second wireless device 200 determines whether the hiddenness or the blocking of the front surface of step S1420 is maintained. If it is determined that the hiddenness of the front surface is maintained, in step S1450, the first wireless device 100 and the second wireless device 200 operate in a first mode. If it is determined that the hiddenness or the blocking of the front surface is not maintained, in step S1460, the first wireless device 100 and the second wireless device 200 operate in a second mode.

In step S1470, the first wireless device 100 and the second wireless device 200 determine whether the wireless distance measurement apps have ended. If it is determined that the wireless distance measurement apps have not ended, the first wireless device 100 and the second wireless device 200 returns to step S1440. If it is determined that the wireless distance measurement apps have ended, in step S1480, the first wireless device 100 and the second wireless device 200 disable the distance estimation modules and end the wireless distance estimation operation.

FIG. 15 is a diagram showing timer measurement between wireless devices for a wireless distance estimation operation according to a first mode of the present invention.

Referring to FIG. 15, the first wireless device 100 includes a timer 110 and a Transmission/Reception (TX/RX) modem 120, and the second wireless device 200 includes a timer 210 and a TX/RX modem 220. The TX/RX modem 120 and the TX/RX modem 220 each includes a Medium Access Control (MAC) processor, a BaseBand (BB) processor, a Radio Frequency (RF) processor, and an antenna (Ant) portion.

As discussed above, timing synchronization between the first and second wireless devices 100 and 200 may be needed, in order to accurately perform the distance measurement operation. Through synchronization between the timer 110 of the first wireless device 100 and the timer 210 of the second wireless device 200, the TX/RX modem 120 of the first wireless device 100 and the TX/RX modem 220 of the second wireless device 200 may be synchronized. Accordingly, in a timing synchronized state, the TX/RX modems 120 and 130 may perform the distance measurement operation according to the exemplary embodiments of the invention.

Figure 16:
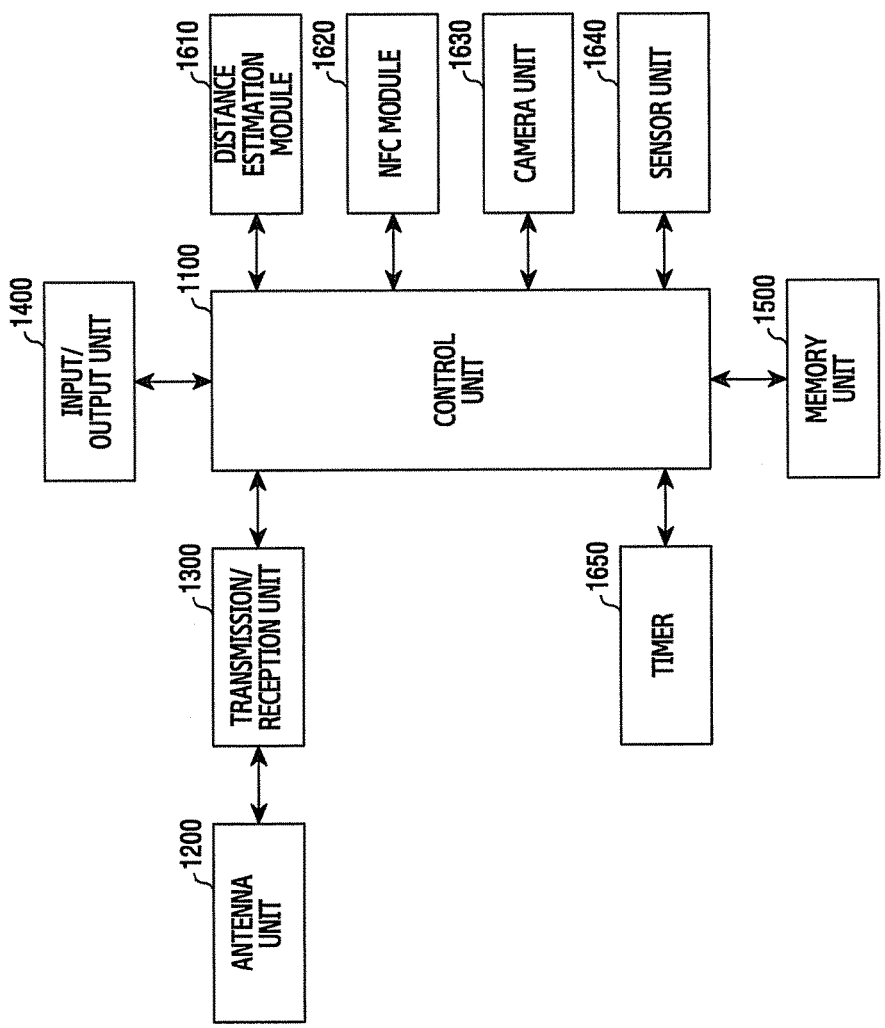
FIG. 16 is a diagram showing a wireless device for a wireless distance measurement operation according to exemplary embodiments of the present invention.

FIG. 16 is a diagram showing a wireless device (e.g., the first wireless device 100 or the second wireless device 200 of FIG. 1) for a wireless distance measurement operation according to exemplary embodiments of the invention. These examples are merely illustrations, and thus should not be construed as limiting.

Referring to FIG. 16, the wireless device includes a control unit 1100, an antenna unit 1200, a transmission/reception unit 1300, an input/output unit 1400, and a memory unit 1500. Also, the wireless device includes a distance estimation module 1610, an NFC module 1620, a camera unit 1630, a sensor unit 1640, and a timer 1650.

The antenna unit 1200 may include a plurality of antenna arrays (not shown), and manages signal transmission/reception. For example, the antenna unit 1200 uses an mmWave technology to transmit/receive a signal of a 60 GHz band. The transmission/reception unit 1300, which may be a transmitter/receiver supporting a beamforming operation, forms one or more beams and processes to transmit/receive a signal through the formed beam. For example, the beamforming transmission/reception unit 1300 may include an encoder (not shown), a modulator (not shown), a demultiplexer (not shown), a beamformer (not shown), a beamforming vector former (not shown), an Orthogonal Frequency Division Multiplexing (OFDM) modulator (not shown), and an RF processor (not shown).

The control unit 1100 controls a plurality of general operations of the wireless device. Particularly, the control unit 1100 controls a distance measurement operation according to exemplary embodiments of the invention. In one exemplary embodiment, the control unit 1100 controls the distance estimation module 1610, and controls the NFC module 1620, the camera unit 1630, or the sensor unit 1640 to control a distance measurement operation according to a first mode. In another exemplary embodiment, the control unit 1100 controls the distance estimation module 1610 to control a distance measurement operation according to a second mode.

The memory unit 1500 may store a program for execution of an operation of the wireless device, data according to the operation execution. The memory unit 1500 may also store a GUI format which is used at displaying a distance measurement result according to exemplary embodiments of the invention. The input/output unit 1400, which may act as an interface between the wireless device and the user, may include an input module (now shown) and a display module (e.g., the display 700 of FIG. 7). The display module may display the distance measurement result according to the exemplary embodiments of the invention. In one exemplary embodiment, the distance measurement result may be displayed with numerical information about the distance measurement result in a measuring tape form, such that a user can intuitively identify the distance measurement result. In another exemplary embodiment, the distance measurement result may be displayed with accuracy information about the distance measurement result. Through the displaying of this distance measurement result, the user may intuitively identify a distance between the first wireless device 100 or second wireless device 200 and the reflector 300.

The distance estimation module 1610 performs a distance measurement operation in accordance with exemplary embodiments of the invention. For example, the distance estimation module 1610 performs a distance measurement operation according to the first mode. For another example, the distance estimation module 1610 performs a distance measurement operation according to the second mode.

If the first wireless device 100 and the second wireless device 200 are located in proximity to each other, the NFC module 1620 NFC connects the first wireless device 100 and the second wireless device 200. As illustrated in FIG. 12, as the first wireless device 100 and the second wireless device 200 are NFC connected with each other, the distance estimation modules thereof are enabled. In some other embodiments, the wireless device may include a plurality of NFC modules 1620.

The camera unit 1630 may include a front camera and a rear camera. As illustrated in FIG. 13, when a hiddenness or a blocking of the first wireless device 100 and the second wireless camera 200 is sensed as a rear camera of the first wireless device 100 and a front camera of the second wireless device 200 are contacted with each other, the distance estimation modules of the first wireless device 100 and the second wireless camera 200 may be enabled. For another example, when a hiddenness or a blocking of the first wireless device 100 and the second wireless camera 200 is sensed as the rear camera of the first wireless device 100 and a rear camera of the second wireless device 200 are contacted with each other, the distance estimation modules the first wireless device 100 and the second wireless camera 200 may be enabled.

The sensor unit 1640 may include a position sensor or an acceleration sensor. As illustrated in FIG. 14, when a rear surface of the first wireless device 100 and a front surface of the second wireless device 200 are contacted with each other, or a hiddenness of a front surface of the second wireless device 200 is sensed by a front position sensor of the second wireless device 200, the distance estimation modules of the first wireless device 100 and the second wireless camera 200 may be enabled. Based on the orientation of the wireless device, the distance measurement result may be displayed differently as illustrated in FIG. 7B and FIG. 7C.

The timer 1650 manages timing of respective constituent elements of the first wireless device 100 and the second wireless device 200. According to exemplary embodiments of the invention, an accurate distance measurement operation may be carried out through synchronization of respective timers (e.g., the timer 110 and the timer 210, of FIG. 15) of the first wireless device 100 and the second wireless timer 200.

The wireless device illustrated in FIG. 16 may serve as a distance measurement apparatus of the second wireless device 200. The distance measurement apparatus includes the transmission/reception unit 1300 and the distance measurement module 1610. The transmission/reception unit 1300 receives a first signal for distance measurement transmitted from the first wireless device 100, and receives a signal reflected by the reflector 300 after being transmitted from the first wireless device 100. Based on the received signals, the distance estimation module 1610 may estimate a distance between the second wireless device 200 and the reflector 300.

In one exemplary embodiment, the distance estimation module 1610 may further perform an operation of enabling a distance measurement function of the second wireless device 200.

For example, the distance estimation module 1610 enables the distance measurement function in response to NFC modules of the first wireless device 100 and the second wireless device 200 being enabled through a contact between the first wireless device 100 and the second wireless device 200.

For another example, the distance estimation module 1610 enables the distance measurement function in response to a hiddenness or a blocking of a rear camera of the first wireless device 100 and a front camera of the second wireless device 200 being sensed through a contact between the first wireless device 100 and the second wireless device 200, or a hiddenness or a blocking of the rear camera of the first wireless device 100 and a rear camera of the second wireless device 200 being sensed through a contact between the first wireless device 100 and the second wireless device 200.

For a further example, the distance estimation module 1610 enables the distance measurement function in response to a hiddenness or a blocking of a front surface of one of the first wireless device 100 and the second wireless device 200 contacting another one of the first wireless device 100 and the second wireless device 200 being sensed.

In one exemplary embodiment, the signal for distance measurement includes a front beam signal transmitted to the front of the first wireless device 100 and a sidelobe signal of the front beam signal. Based on a reception time difference between the sidelobe signal and the reflected signal, the distance estimation module 1710 estimates a distance between the second wireless device 200 and the reflector 300.

In another exemplary embodiment, the signal for distance measurement includes a front beam signal transmitted to the front of the first wireless device 100 and a rear beam signal transmitted to the rear of the first wireless device 100. Based on a reception time difference between the rear beam signal and the reflected signal, the distance estimation module 1710 estimates a distance between the second wireless device 200 and the reflector 300.

In a further exemplary embodiment, the transmitted first signal includes a front beam signal transmitted to the front of the first wireless device 100 and a beam signal that the first wireless device 100 transmits in the direction of the second wireless device 200. The distance between the first wireless device 100 and the second wireless device 200, and the reflector 300 is estimated based on a reception time difference between the second wireless device direction beam signal and the reflected signal.

In one exemplary embodiment, the transmission/reception unit 1300 further performs an operation of providing information about the estimated distance to the first wireless device 100.

In one exemplary embodiment, the second wireless device 200 further includes the timer 1650 for synchronizing the first wireless device 100 and the second wireless device 200.

The wireless device illustrated in FIG. 16 may function as a distance measurement apparatus of the first wireless device 100. The distance measurement apparatus includes the transmission/reception unit 1300 and the distance estimation module 1610. The transmission/reception unit 1300 transmits a signal for distance measurement, and receives information about a distance between the second wireless device 200 (or the first wireless device 100) and the reflector 300, and the distance may be estimated by the second wireless device 200.

In one exemplary embodiment, the information about the estimated distance includes information about a distance estimated based on a first signal received from the second wireless device 200 after being transmitted from the first wireless device 100, and a signal reflected by the reflector 300 and received by the second wireless device 200 after being transmitted from the first wireless device 100.

In one exemplary embodiment, the distance estimation module 1610 further performs an operation of enabling a distance measurement function of the first wireless device 100.

For example, the distance estimation module 1610 enables the distance measurement function in response to NFC modules of the first wireless device 100 and the second wireless device 200 being enabled through a contact between the first wireless device 100 and the second wireless device 200.

For another example, the distance estimation module 1610 enables the distance measurement function in response to a hiddenness or a blocking of a rear camera of the first wireless device 100 and a front camera of the second wireless device 200 being sensed through a contact between the first wireless device 100 and the second wireless device 200, or a hiddenness or a blocking of the rear camera of the first wireless device 100 and a rear camera of the second wireless device 200 being sensed through a contact between the first wireless device 100 and the second wireless device 200.

For a further example, the distance estimation module 1610 enables the distance measurement function in response to a hiddenness or a blocking of a front surface of one of the first wireless device 100 and the second wireless device 200 contacting with another one of the first wireless device 100 and the second wireless device 200 being sensed.

In one exemplary embodiment, the first signal for distance measurement includes a front beam signal transmitted to the front of the first wireless device 100 and a sidelobe signal of the front beam signal. The information about the estimated distance includes information about a distance estimated based on a reception time difference between the sidelobe signal and the reflected signal.

In another exemplary embodiment, the first signal for distance measurement includes a front beam signal transmitted to the front of the first wireless device 100 and a rear beam signal transmitted to the rear of the first wireless device 100. The information about the estimated distance includes information about a distance estimated based on a reception time difference between the rear beam signal and the reflected signal.

In a further exemplary embodiment, the transmitted signal includes a front beam signal transmitted to the front of the first wireless device 100 and a beam signal that the first wireless device 100 transmits in the direction of the second wireless device 200. The distance between the first wireless device 100 and the second wireless device 200, and the reflector 300 is estimated based on a reception time difference between the second wireless device direction beam signal and the reflected signal.

In one exemplary embodiment, the first wireless device 100 further includes the input/output unit 1400 for externally displaying the information about the estimated distance.

In one exemplary embodiment, the input/output unit 1400 displays the information about the estimated distance with numerical information in a measuring tape form.

In one exemplary embodiment, the distance estimation module 1610 further performs an operation of predicting the accuracy of the information about the estimated distance. The input/output unit 1400 further displays the predicted accuracy together with the information about the estimated distance.

In one exemplary embodiment, the first wireless device 100 further includes the timer 1650 for synchronizing the first wireless device 100 and the second wireless device 200.

Figure 17A:
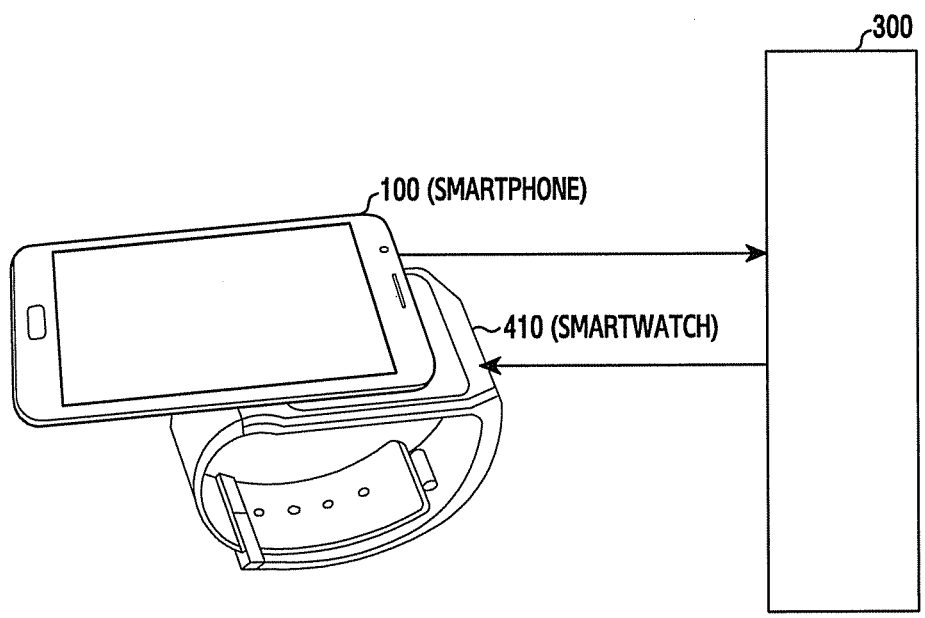
FIG. 17A to FIG. 17C are diagrams showing wireless distance measurement operations according to exemplary embodiments of the present invention are performed between various wireless devices.
Figure 17B:
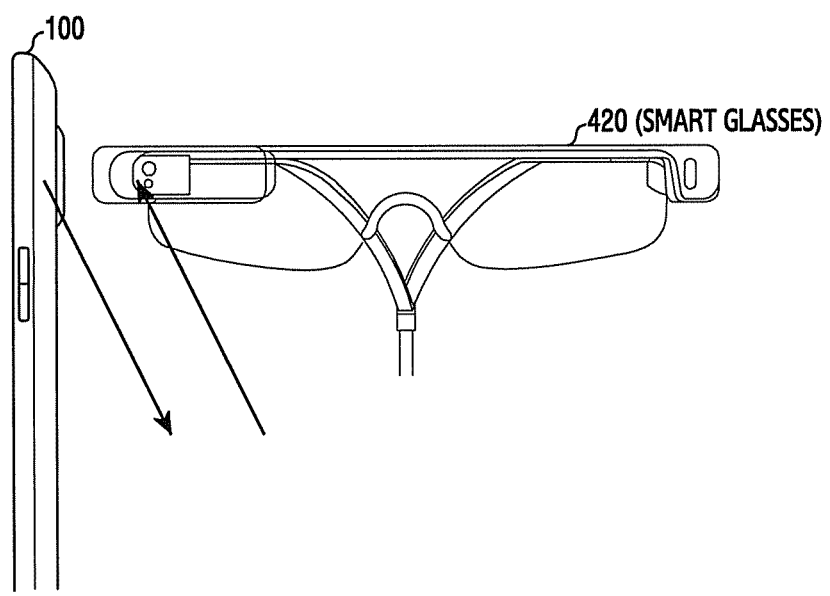
Figure 17C:
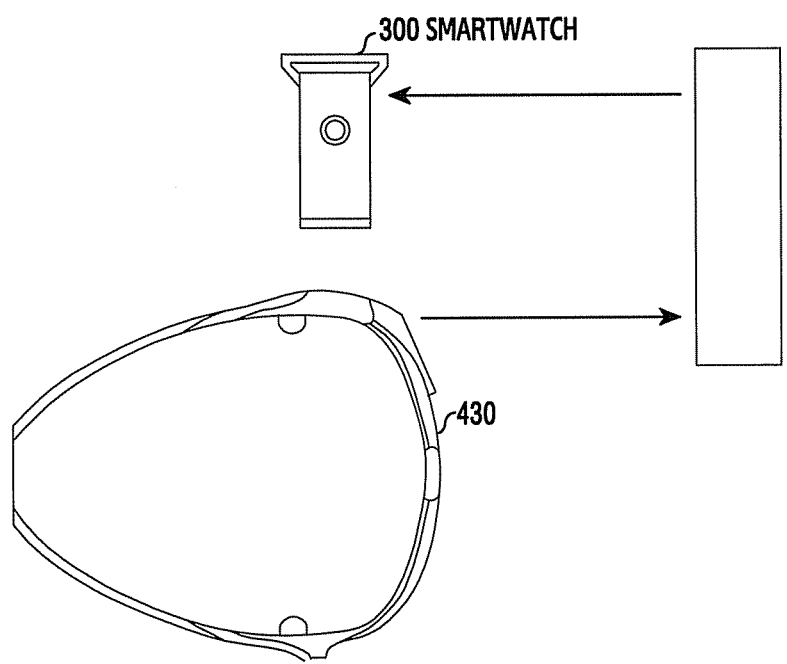

FIG. 17A to FIG. 17C are diagrams showing wireless distance measurement operations according to exemplary embodiments of the invention between various wireless devices. The figures according to the aforementioned exemplary embodiments include smartphones as the wireless devices. However, these examples are merely illustrations, they should not be construed as limiting. FIG. 17A to FIG. 17C illustrate examples of use of various wireless devices.

FIG. 17A illustrates an example in which the first wireless device 100 is implemented as a smartphone and the second wireless device 410 is implemented as a smartwatch.

FIG. 17B illustrates an example in which the first wireless device 100 is implemented as a smartphone and the second wireless device 420 is implemented as smart glasses.

FIG. 17C illustrates an example in which the first wireless device 420 is implemented as smart glasses and the second wireless device 430 is implemented as a smartwatch.

As described above, exemplary embodiments of the present invention may use two wireless devices to measure a distance between the wireless devices and a reflector or a distance between the wireless devices. Also, the exemplary embodiments of the invention may allow a user to conveniently recognize or identify a distance measurement result between the wireless devices and the reflector.

Although the invention has been shown and described with reference to limited preferred embodiments thereof and the drawings thereof, the invention is not limited to the aforementioned exemplary embodiments, and various changes and modifications in form and details may be made therein without departing from the spirit and scope of the invention by a person having ordinary knowledge in the art to which the invention belongs. Operations according to an exemplary embodiment of the invention may be implemented by a single processor. In this case, a program instruction for performing an operation implemented by various computers may be recorded in a computer-readable recording media. The computer-readable recording media may include a program instruction, a data file, a data structure, etc. singularly or in combination. The program instruction may be specially designed and constructed for the invention or may be known to and usable by a person skilled in the art. An example of the computer-readable recording media includes a magnetic media such as a hard disk, a floppy disk, and a magnetic tape, an optical recording media such as a Compact Disc-Read Only Memory (CD-ROM) and a Digital Versatile Disc (DVD), a Magneto-Optical Media such as a floptical disk, and a hardware device specially configured to store and perform a program instruction such as a Read Only Memory (ROM), a Random Access Memory (RAM), a flash memory, etc. An example of the program instruction includes not only a mechanical language code such as a code made by a compiler but also a high-level language code using an interpreter, etc. to be executable by a computer. If all or some of base stations or relays described in the invention are implemented by a computer program, even the computer-readable recording media storing the computer program is included in the invention. Therefore, the scope of the invention should not be limited to and defined by the described exemplary embodiments, and should be defined by not only claims described below but also equivalents to the claims.

What is claimed is:

1. A method for operating a second wireless device in a wireless communication system, the method comprising:
   receiving a first signal for distance measurement transmitted from a first wireless device;
   receiving a reflected signal, wherein the reflected signal is the first signal reflected by a reflector;
   estimating a distance between the second wireless device and the reflector, wherein:
      the first signal comprises a beam signal transmitted to the reflector and a sidelobe signal of the beam signal, and
      the distance is estimated based on a reception time difference between the sidelobe signal and the reflected signal;
   determining an accuracy for the distance based on a correlation peak regarding the reflected signal; and
   displaying the estimated distance on a screen of the second wireless device.

2. The method of claim 1, further comprising, when detecting that the first wireless device is located within a designated range from the second wireless device, enabling a function of the distance measurement of the second wireless device.

3. The method of claim 2, wherein enabling the function of the distance measurement comprises enabling the function of the distance measurement in response to at least one of a) a hiddenness of a rear camera of the first wireless device and a front camera of the second wireless device being sensed through a contact between the first wireless device and the second wireless device, and b) a hiddenness of a rear camera of the first wireless device and a rear camera of the second wireless device being sensed through a contact between the first wireless device and the second wireless device.

4. The method of claim 2, wherein enabling the function of the distance measurement comprises enabling the function of the distance measurement in response to a hiddenness of a front surface of one of the first wireless device and the second wireless device contacting with another of the first wireless device and the second wireless device being sensed.

5. The method of claim 1, further comprising enabling a function of the distance measurement in response to near field communication (NFC) modules being enabled through a contact between the first wireless device and the second wireless device.

6. The method of claim 1, wherein the first signal for the distance measurement comprises a front beam signal transmitted to the front of the first wireless device and a rear beam signal transmitted to the rear of the first wireless device, and
   wherein estimating the distance between the second wireless device and the reflector comprises estimating the distance based on a reception time difference between the rear beam signal and the reflected signal.

7. The method of claim 1, further comprising providing information about the estimated distance to the first wireless device.

8. The method of claim 1, further comprising synchronizing the first wireless device and the second wireless device.

9. The method of claim 1, wherein estimating the distance comprises:
   determining a first reception time of the first signal, wherein the first reception time is a time at which a first correlation peak regarding the first signal is detected;
   determining a second reception time of the reflected signal, wherein the second reception time is a time at which the correlation peak regarding the reflected signal is detected; and
   determining a time difference between the first reception time and the second reception time.

10. A method for operating by a first wireless device in a wireless communication system, the method comprising:
    transmitting a first signal for distance measurement, wherein the first signal comprises a beam signal transmitted to a reflector and a sidelobe signal of the beam signal; and
    receiving, from the second wireless device, information about a distance between a second wireless device and a reflector, wherein the distance is estimated by the second wireless device based on a reception time difference between the sidelobe signal and the reflected signal, wherein an accuracy for the distance is determined based on a correlation peak regarding the reflected signal; and
    displaying the estimated distance on a screen of the first wireless device.

11. The method of claim 10, further comprising, when detecting that the first wireless device is located within a designated range from the second wireless device, enabling a function of the distance measurement of the first wireless device.

12. The method of claim 10, further comprising enabling a function of the distance measurement in response to near field communication (NFC) modules being enabled through a contact between the first wireless device and the second wireless device.

13. The method of claim 10, wherein enabling the function of the distance measurement comprises enabling the function of the distance measurement in response to at least one of a) a hiddenness of a rear camera of the first wireless device and a front camera of the second wireless device being sensed through a contact between the first wireless device and the second wireless device, and b) a hiddenness of the rear camera of the first wireless device and a rear camera of the second wireless device being sensed through a contact between the first wireless device and the second wireless device.

14. The method of claim 11, wherein enabling the function of the distance measurement comprises enabling the function of the distance measurement in response to a hiddenness of a front surface of one of the first wireless device and the second wireless device contacting with another of the first wireless device and the second wireless device being sensed.

15. The method of claim 10, wherein the first signal for the distance measurement comprises a front beam signal transmitted to the front of the first wireless device and a rear beam signal transmitted to the rear of the first wireless device, and
wherein the information about the estimated distance comprises information about a distance estimated based on a reception time difference value between the rear beam signal and the reflected signal.

16. The method of claim 10, wherein displaying the information about the estimated distance comprises displaying the information about the estimated distance together with numerical information in a measuring tape form.

17. The method of claim 16,
wherein displaying the information about the estimated distance further comprises displaying the accuracy together with the information about the estimated distance.

18. The method of claim 10, further comprising synchronizing the first wireless device and the second wireless device.

19. An apparatus of a second wireless device in a wireless communication system, the apparatus comprising:
a screen;
least one transceiver configured to:
receive a first signal for distance measurement transmitted from a first wireless device; and
receive a reflected signal, wherein the reflected signal is the first signal reflected by a reflector; and
at least one processor configured to:
estimate a distance between the second wireless device and the reflector, wherein;
the first signal comprises a beam signal transmitted to the reflector and a sidelobe signal of the beam signal, and
the distance is estimated based on a reception time difference between the sidelobe signal and the reflected signal;
determine an accuracy for the distance based on a correlation peak regarding the reflected signal; and
display the estimated distance on the screen.

20. The apparatus of claim 19, wherein the at least one processor is further configured to enable, when detecting that the first wireless device is located within a designated range from the second wireless device, a function of the distance measurement of the second wireless device.

21. The apparatus of claim 19, wherein the at least one processor is further configured to enable a function of the distance measurement in response to near field communication (NFC) modules being enabled through a contact between the first wireless device and the second wireless device.

22. The apparatus of claim 20, wherein the at least one processor is configured to enable the function of the distance measurement in response to at least one of a) a hiddenness of a rear camera of the first wireless device and a front camera of the second wireless device being sensed through a contact between the first wireless device and the second wireless device is sensed, and b) a hiddenness of the rear camera of the first wireless device and a rear camera of the second wireless device being sensed through a contact between the first wireless device and the second wireless device.

23. The apparatus of claim 20, wherein the at least one processor is configured to enable the function of the distance measurement in response to a hiddenness of a front surface of one of the first wireless device and the second wireless device contacting with another of the first wireless device and the second wireless device being sensed.

24. The apparatus of claim 19, wherein the first signal for the distance measurement comprises a front beam signal transmitted to the front of the first wireless device and a rear beam signal transmitted to the rear of the first wireless device, and
wherein the at least one processor is configured to estimate the distance based on a reception time difference between the rear beam signal and the reflected signal.

25. The apparatus of claim 19, wherein the transmission/reception unit is further configured to perform an operation of providing information about the estimated distance to the first wireless device.

26. The apparatus of claim 19, further comprising a timer configured to synchronize the first wireless device and the second wireless device.

27. The apparatus of claim 19, wherein the at least one processor is, in order to estimate the distance, configured to:
determine a first reception time of the first signal, wherein the first reception time is a time at which a first correlation peak regarding the first signal is detected;
determine a second reception time of the reflected signal, wherein the second reception time is a time at which the correlation peak regarding the reflected signal is detected; and
determine a time difference between the first reception time and the second reception time.

28. An apparatus of a first wireless device in a wireless communication system, the apparatus comprising:
a screen;
at least one transceiver configured to:
transmit a first signal for distance measurement, wherein the first signal comprises a beam signal transmitted to a reflector and a sidelobe signal of the beam signal; and
receive, from a second wireless device, information about a distance between the second wireless device and a reflector, wherein the distance is estimated by the second wireless device based on a reception time difference between the sidelobe signal and the reflected signal, wherein an accuracy for the distance is determined based on a correlation peak regarding the reflected signal; and
at least one processor configured to display the estimated distance on the screen of the first wireless device.

29. The apparatus of claim 28, wherein the at least one processor is further configured to enable a function of the distance measurement of the first wireless device.

30. The apparatus of claim 29, wherein the at least one processor is configured to enable the function of the distance measurement in response to near field communication (NFC) modules being enabled by a contact between the first wireless device and the second wireless device.

31. The apparatus of claim 29, wherein the at least one processor is configured to enable the function of the distance measurement in response to at least one of a) a hiddenness of a rear camera of the first wireless device and a front camera of the second wireless device being sensed through a contact between the first wireless device and the second wireless device, and b) a hiddenness of the rear camera of the first wireless device and a rear camera of the second wireless device being sensed through a contact between the first wireless device and the second wireless device.

32. The apparatus of claim 29, wherein the at least one processor is configured to enable the function of the distance measurement in response to a hiddenness of a front surface of one of the first wireless device and the second wireless device contacting with another of the first wireless device and the second wireless device being sensed.

33. The apparatus of claim 28, wherein the first signal for the distance measurement comprises a front beam signal transmitted to the front of the first wireless device and a rear beam signal transmitted to the rear of the first wireless device, and
wherein the information about the estimated distance comprises information about a distance estimated based on a reception time difference between the rear beam signal and the reflected signal.

34. The apparatus of claim 28, wherein the screen is further configured to display the information about the estimated distance together with numerical information in a measuring tape form.

35. The apparatus of claim 28,
wherein the screen is further configured to display the accuracy together with the information about the estimated distance.

36. The apparatus of claim 28, further comprising a timer configured to synchronize the first wireless device and the second wireless device.

* * * * *